US011975902B2

(12) United States Patent
Fahrner et al.

(10) Patent No.: US 11,975,902 B2
(45) Date of Patent: May 7, 2024

(54) ARTICLE CARRIER AND BLANK THEREFOR

(71) Applicant: WestRock Packaging Systems, LLC, Atlanta, GA (US)

(72) Inventors: Vincent Fahrner, Chateauroux (FR); Julien D. Merzeau, Chateauroux (FR)

(73) Assignee: WestRock Packaging Systems, LLC, Atlanta, GA (US)

( * ) Notice: Subject to any disclaimer, the term of this patent is extended or adjusted under 35 U.S.C. 154(b) by 0 days.

(21) Appl. No.: 18/079,535

(22) Filed: Dec. 12, 2022

(65) Prior Publication Data

US 2023/0182984 A1 Jun. 15, 2023

Related U.S. Application Data

(63) Continuation of application No. 17/291,324, filed as application No. PCT/US2019/058271 on Oct. 28, 2019, now Pat. No. 11,524,826.

(Continued)

(51) Int. Cl.

| | |
|---|---|
| ***B65D 71/30*** | (2006.01) |
| ***B31B 50/86*** | (2017.01) |

(Continued)

(52) U.S. Cl.

CPC .............. *B65D 71/30* (2013.01); *B31B 50/86* (2017.08); *B65D 71/38* (2013.01); *B31B 50/624* (2017.08);

(Continued)

(58) Field of Classification Search

CPC ... B31B 50/624; B31B 50/86; B31B 2105/00; B31B 2120/302; B65D 71/30;

(Continued)

(56) References Cited

U.S. PATENT DOCUMENTS

| | | | | |
|---|---|---|---|---|
| 5,853,088 A * | 12/1998 | Saulas | B65D 71/36 206/427 |
| 6,065,590 A * | 5/2000 | Spivey | B65D 71/36 206/427 |

(Continued)

FOREIGN PATENT DOCUMENTS

| | | |
|---|---|---|
| EP | 0754631 A1 | 1/1997 |
| WO | 2018/031391 A1 | 2/2018 |

*Primary Examiner* — Bryon P Gehman

(74) *Attorney, Agent, or Firm* — Brian J. Goldberg; Rohini K. Garg

(57) ABSTRACT

Aspects of the disclosure relate to a package, an article carrier, and a blank (810) for forming the article carrier. An aspect of the invention provides an article carrier comprising a plurality of primary panels (812,814,816) at least partially extending around an interior of the article carrier. The plurality of primary panels comprises a first side panel (812), a top panel (814), a second side pane (816)1 and at least one bottom panel joined together to form a tubular structure having first and second opposed open ends. The article carrier comprises a carrying handle (H) including a handle feature defined in at least the top panel and a foldable handle structure (HS) having opposed connecting panels and a handle strap. The handle strap extends (882) between the connecting panels.

20 Claims, 20 Drawing Sheets

Related U.S. Application Data

(60) Provisional application No. 62/787,564, filed on Jan. 2, 2019, provisional application No. 62/756,145, filed on Nov. 6, 2018.

(51) Int. Cl.

| | |
|---|---|
| ***B65D 71/38*** | (2006.01) |
| *B31B 50/62* | (2017.01) |
| *B31B 105/00* | (2017.01) |
| *B31B 120/30* | (2017.01) |

(52) U.S. Cl.

CPC ..... *B31B 2105/00* (2017.08); *B31B 2120/302* (2017.08); *B31B 2241/001* (2013.01); *B65D 2571/00141* (2013.01); *B65D 2571/00277* (2013.01); *B65D 2571/00462* (2013.01); *B65D 2571/00524* (2013.01); *B65D 2571/0066* (2013.01); *B65D 2571/00666* (2013.01); *B65D 2571/00728* (2013.01); *B65D 2571/0079* (2013.01); *B65D 2571/0087* (2013.01)

(58) Field of Classification Search

CPC .......... B65D 71/38; B65D 2571/00141; B65D 2571/00277; B65D 2571/00462; B65D 2571/00524; B65D 2571/0066; B65D 2571/00666; B65D 2571/00728; B65D 2571/0079; B65D 2571/0087

USPC ........................................ 206/141, 162, 427

See application file for complete search history.

(56) References Cited

U.S. PATENT DOCUMENTS

| | | | | |
|---|---|---|---|---|
| 6,202,920 | B1 | 3/2001 | Auclair | |
| 6,848,573 | B2 | 2/2005 | Gould et al. | |
| 6,905,066 | B2 * | 6/2005 | Holley, Jr. ............. | B65D 71/36 229/117.14 |
| 2019/0283947 | A1 | 9/2019 | Merzeau | |

* cited by examiner

ARTICLE CARRIER AND BLANK THEREFOR

TECHNICAL FIELD

The present invention relates to product packaging, to article carriers or cartons, and to blanks for forming the same. More specifically, but not exclusively, the invention relates to a carrier having a carrying handle arranged transversely with respect to a tubular axis of an at least partially open ended tubular structure.

BACKGROUND

In the field of packaging it is known to provide article carriers or cartons for carrying multiple articles. Cartons are well known in the art and are useful for enabling consumers to transport, store and access a group of articles for consumption. For cost and environmental considerations, such cartons or carriers need to be formed from as little material as possible and cause as little wastage in the materials from which they are formed as possible. Further considerations are the strength of the carton and its suitability for holding and transporting large weights of articles. It is desirable that the contents of the carton are secure within the carton.

It is an object of the present disclosure to provide a carton or article carrier having a handle structure. It is desirable to provide the carton with an opening to display the articles disposed therein. It is desirable that the handle structure is sufficiently strong and robust when in use transporting the carton.

The present invention seeks to provide an improvement in the field of cartons and carton blanks, typically formed from paperboard or the like.

SUMMARY

A first aspect of the disclosure provides a carton for packaging one or more articles. The carton comprises a plurality of primary panels at least partially extending around an interior of the carton. The plurality of primary panels comprises a top panel and a pair of side panels hingedly connected to opposing side edges of the top panel respectively. The carton comprises a carrying handle including a handle feature defined in at least the top panel and a foldable handle structure having opposed connecting panels and a handle strap extending between the connecting panels. The handle structure is hingedly connected at the opposed connecting panels thereof to the side panels along respective first edges of the side panels. The handle structure is folded into the interior of the carton such that the handle strap is disposed generally in vertical alignment with the handle feature. The carton comprises first and second opposed ends defined at least in part by opposed end edges of the top panel respectively. The first end of the carton is at least partially open and comprises an end opening extending at least between the first edges of the side panels.

One advantage of the present disclosure is that it provides a carton having a tubular structure with a display window in at least one end thereof. A carrying handle is provided which extends transversely of a tubular axis of the tubular structure. It is desirable that the grain direction of the substrate forming the carton extends transversely with respect to a tubular axis of the tubular structure or so that the grain direction extends top to bottom in the side panels of the carton. The handle structure arrangement of the present disclosure is beneficially arranged such that the grain direction of the substrate extends longitudinally along the handle strap.

A further advantage of the present disclosure is that the handle structure is secured or glued to the largest panels of the carton. The largest panels may be the side panels. The side panels may be unitary; the side panels extend from one end of the tubular structure to the other opposing end of the tubular structure and may also extend substantially from the top of the carton to the bottom of the carton.

Optionally, the first end of the carton comprises an end closure structure which partially closes the first end of the carton, the end closure structure comprises side end flaps hingedly connected to the first end edges of the side panels respectively.

Optionally, the handle strap comprises opposed end portions and an intermediate portion extending between the opposed end portions, each of the opposed end portions formed at least partially from a respective one of the connecting panels.

Optionally, the plurality of panels comprises a base panel extending between the side panels such that the plurality of primary panels provides a tubular structure defining a tubular axis, the first edges of the side panels are disposed transversely to the tubular axis.

Optionally, the carton is formed from at least first and second separate blanks, wherein the first blank comprises a panel for forming the base panel, and wherein the second blank comprises panels for forming the top panel, the side panels and the handle structure.

Optionally, the handle structure comprises at least one reinforcing member.

Optionally, the at least one reinforcing member is hingedly connected to the handle structure.

Optionally, the at least one reinforcing member is hingedly connected to at least one of the connecting panels.

Optionally, the at least one reinforcing member is hingedly connected to the central portion of the handle strap.

Optionally, the at least one reinforcing member is hingedly connected to the handle strap.

Optionally, the handle structure comprises a first reinforcing member hingedly connected to the first connecting panel.

Optionally, the handle structure comprises a second reinforcing member hingedly connected to the second connecting panel.

Optionally, the first and second reinforcing members are hingedly opposed to each other.

Optionally, the hinged connections between the opposed connecting panels and the side panels are offset with respect to one of the opposed end edges of the top panel.

Optionally, the hinged connections between the opposed connecting panels and the side panels are inset with respect to one of the opposed end edges of the top panel.

Optionally, the hinged connections between the opposed connecting panels and the side panels are inset with respect to adjacent edge portions of the side panels.

A second aspect of the disclosure provides a carton for packaging one or more articles. The carton comprises a plurality of primary panels at least partially extending around an interior of the carton. The plurality of primary panels comprises a first side panel, a top panel, a second side panel and at least one bottom panel joined together to form a tubular structure having first and second opposed open ends. The carton comprises a carrying handle including a handle feature defined in at least the top panel and a foldable handle structure having opposed connecting panels and a handle strap. The handle strap extends between the connecting panels. The handle structure is hingedly connected at the opposed connecting panels thereof to the first end of the tubular structure such that the handle structure is foldable into the interior of the carton so as to be disposed generally in vertical alignment with the handle feature.

Optionally, the connecting panels are hingedly connected to respective first edges of the side panels along first fold lines respectively, the carton comprises a first end wall for at least partially closing the first end of the tubular structure.

Optionally, the first end wall comprises at least one end closure panel hingedly connected to the first end edge of at least one of the side panels.

Optionally, the first end wall comprises at least one side end closure flap hingedly connected to the first end edge of at least one of the side panels.

A third aspect of the disclosure provides at least one blank for forming a carton. The blank comprises a plurality of primary panels for at least partially extending around an interior of the carton. The plurality of primary panels comprises a top panel and a pair of side panels hingedly connected to opposing side edges of the top panel respectively. The blank further comprises a carrying handle including a handle feature defined in at least the top panel and a foldable handle structure having opposed connecting panels and a handle strap extending between the connecting panels. The handle structure is hingedly connected at the opposed connecting panels thereof to the side panels along respective first edges of the side panels. The handle structure is foldable such that the handle strap is disposed generally in vertical alignment with the handle feature. The blank comprises first and second opposed ends defined at least in part by opposed end edges of the top panel respectively. In a setup condition the first end of the carton is at least partially open and comprises an end opening extending at least between the first edges of the side panels.

A fourth aspect of the disclosure provides a blank for forming a carton, the blank comprises a plurality of primary panels for at least partially defining an interior of the carton. The plurality of primary panels comprises a first side panel, a top panel, a second side panel and at least one bottom panel joined together to form a tubular structure having first and second opposed open ends. The blank comprises a carrying handle including a handle feature defined in at least the top panel and a foldable handle structure having opposed connecting panels and a handle strap, extending between the connecting panels. The handle structure is hingedly connected at the opposed connecting panels thereof to the first end of the tubular structure such that the handle structure is foldable into the interior of the carton so as to be disposed generally in vertical alignment with the handle feature.

A fifth aspect of the disclosure provides a blank for forming a carton. The blank comprises a plurality of main panels forming at least part of a tubular structure of a carton the plurality of main panels hinged one to the next in a linear series. The blank comprises a handle structure hinged along a first edge of the plurality of main panels. The handle structure comprises a series of panels, a first one of the series of panels is hinged to a first panel of the plurality of main panels and a second one of the series of panels is hinged to a second panel the plurality of main panels. The second panel opposes the first panel in a setup condition. The blank comprises at least one end closure panel hinged along the first edge of the plurality of main panels. The at least one end closure panel is disposed between plurality of main panels providing the tubular structure and the series of panels providing the handle structure.

Optionally, at least one end closure panel is separated from the series of panels providing the handle structure by a cutaway, wherein the cutaway comprises a severance feature selected from the group consisting of an aperture, slot, slit, cut line, severable line.

Within the scope of this application it is envisaged or intended that the various aspects, embodiments, examples, features and alternatives set out in the preceding paragraphs, in the claims and/or in the following description and drawings may be considered or taken independently or in any combination thereof.

Features or elements described in connection with, or relation to, one embodiment are applicable to all embodiments unless there is an incompatibility of features. One or more features or elements from one embodiment may be incorporated into, or combined with, any of the other embodiments disclosed herein, said features or elements extracted from said one embodiment may be included in addition to, or in replacement of one or more features or elements of said other embodiment.

A feature, or combination of features, of an embodiment disclosed herein may be extracted in isolation from other features of that embodiment. Alternatively, a feature, or combination of features, of an embodiment may be omitted from that embodiment.

BRIEF DESCRIPTION OF THE DRAWINGS

Embodiments of the invention will now be described with reference to the accompanying drawings, in which.

DETAILED DESCRIPTION OF EMBODIMENTS

Detailed descriptions of specific embodiments of the package, article carrier and blank are disclosed herein. It will be understood that the disclosed embodiments are merely examples of the way in which certain aspects of the invention can be implemented and do not represent an exhaustive list of all of the ways the invention may be embodied. As used herein, the word "exemplary" is used expansively to refer to embodiments that serve as illustrations, specimens, models, or patterns. Indeed, it will be understood that the packages, article carriers and blanks described herein may be embodied in various and alternative forms. The Figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
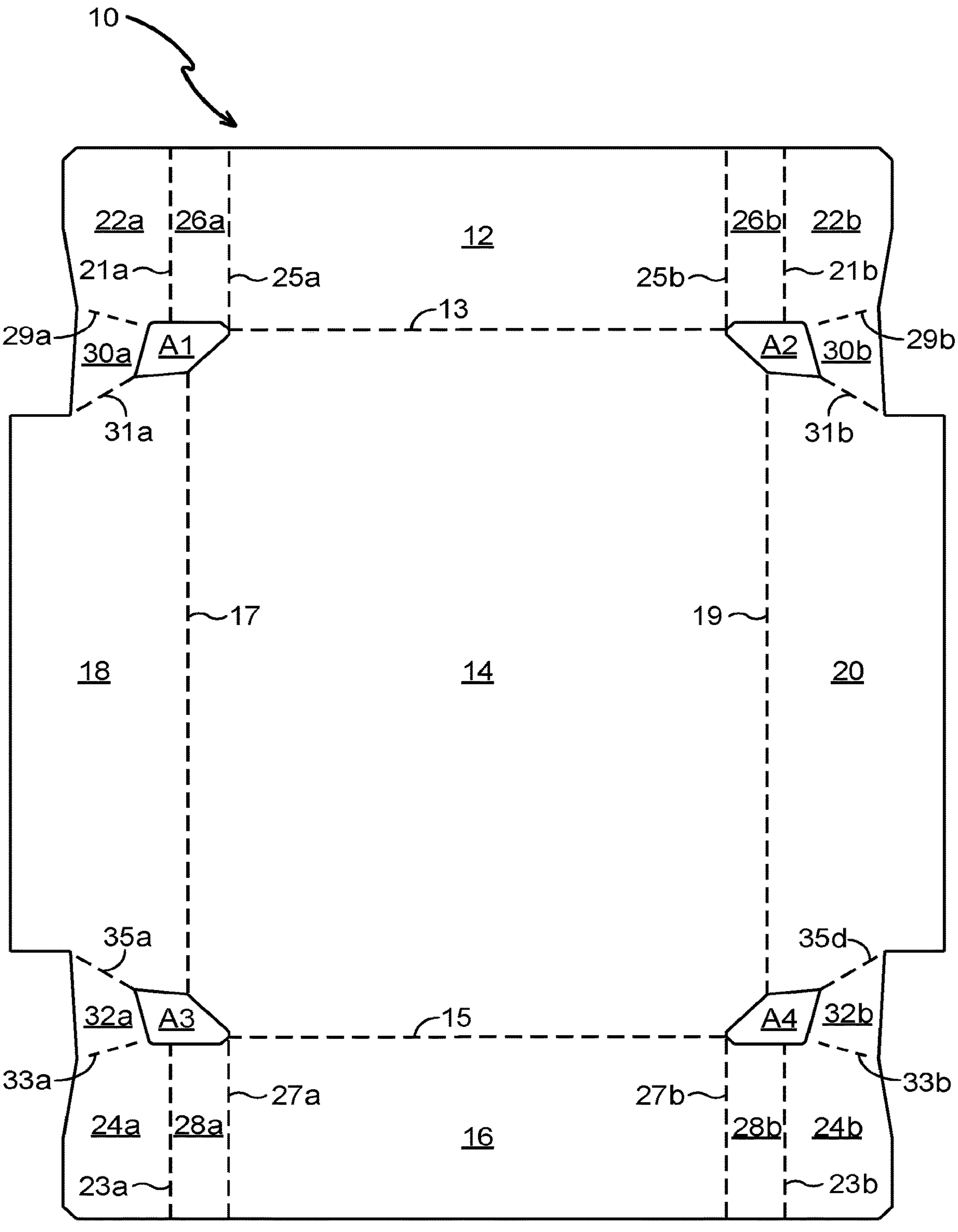
FIG. 1 is a plan view from above of a first blank for forming an article carrier according to a first embodiment.
Figure 2:
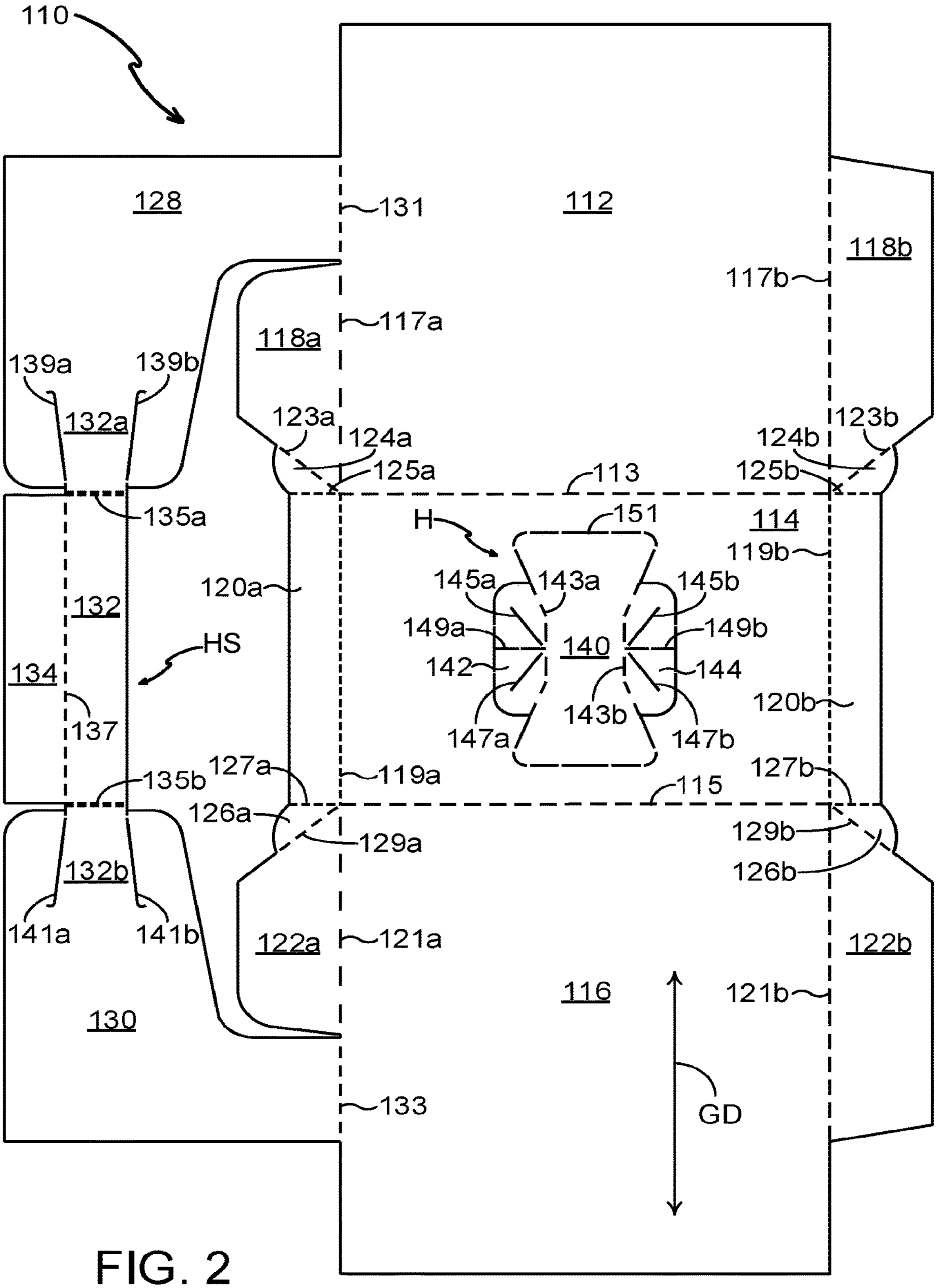
FIG. 2 is a plan view from above of a second blank for forming an article carrier according to a first embodiment.
Figure 6:
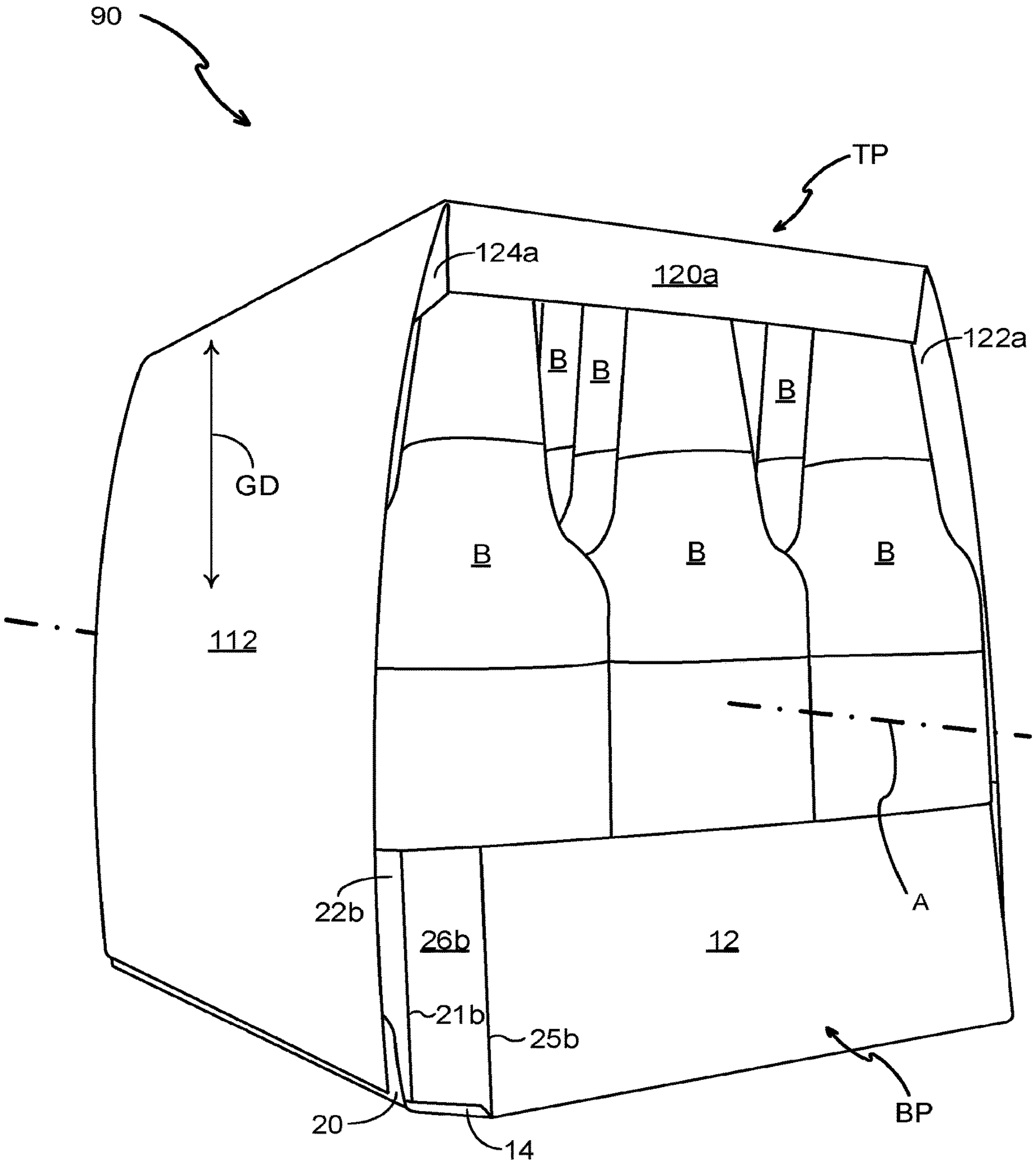
FIG. 6 is a perspective view of an article carrier formed from the blank of FIGS. 1 and 2.

Referring to FIGS. 1 and 2, there is shown plan views of a first blank 10 and a second blank 110 respectively, according to an embodiment of the disclosure, capable of forming a package in the form of an article carrier 90, as shown in FIG. 6, for containing and carrying a group of primary products such as, but not limited to, bottles, hereinafter referred to as articles B.

The first blank 10 forms a base or tray portion BP, the second blank 110 forms an upper portion TP of the article carrier, also referred to herein as a top or cover.

Figure 7:
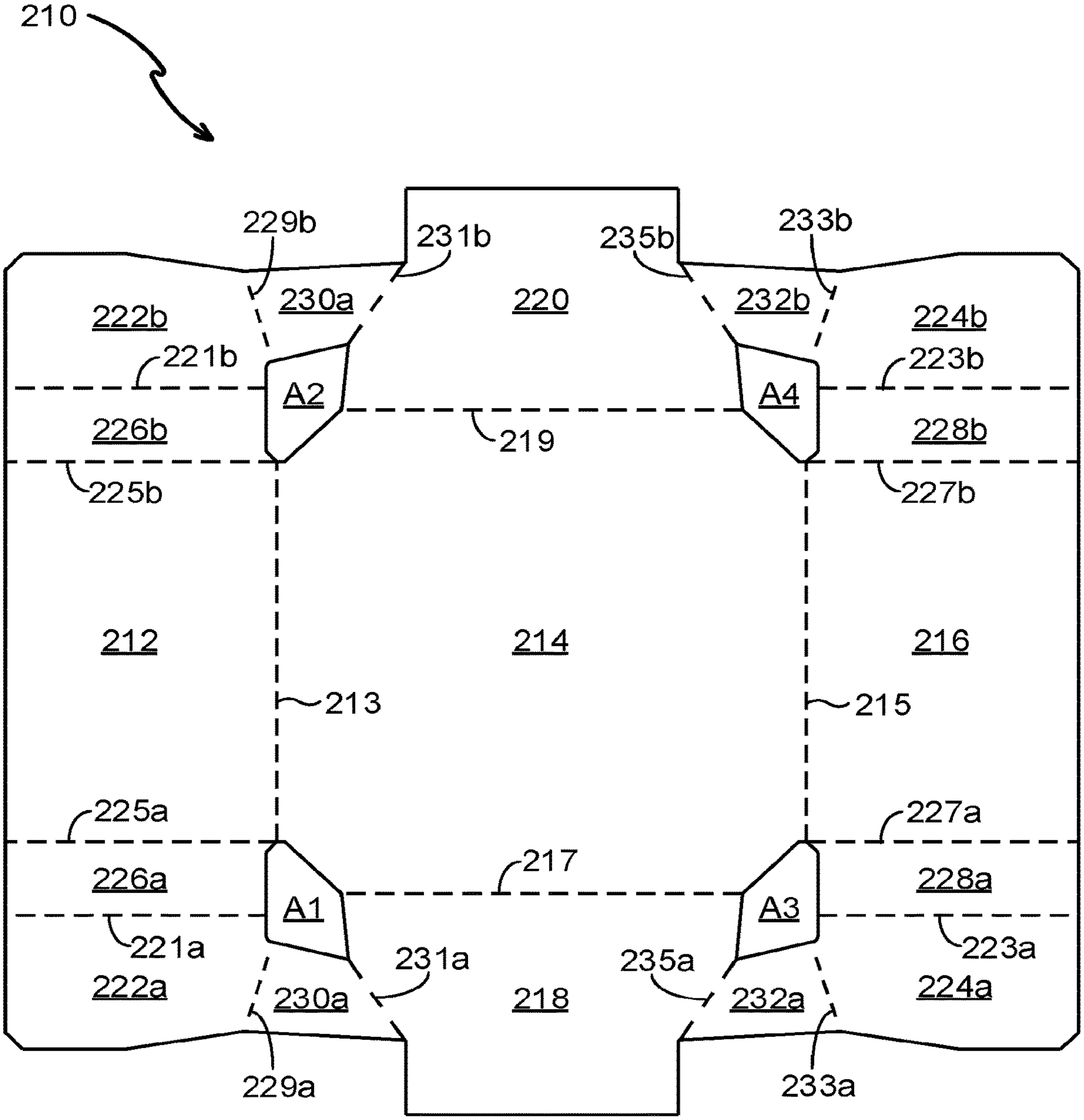
FIG. 7 is a plan view from above of a first blank for forming an article carrier according to a second embodiment.
Figure 8:
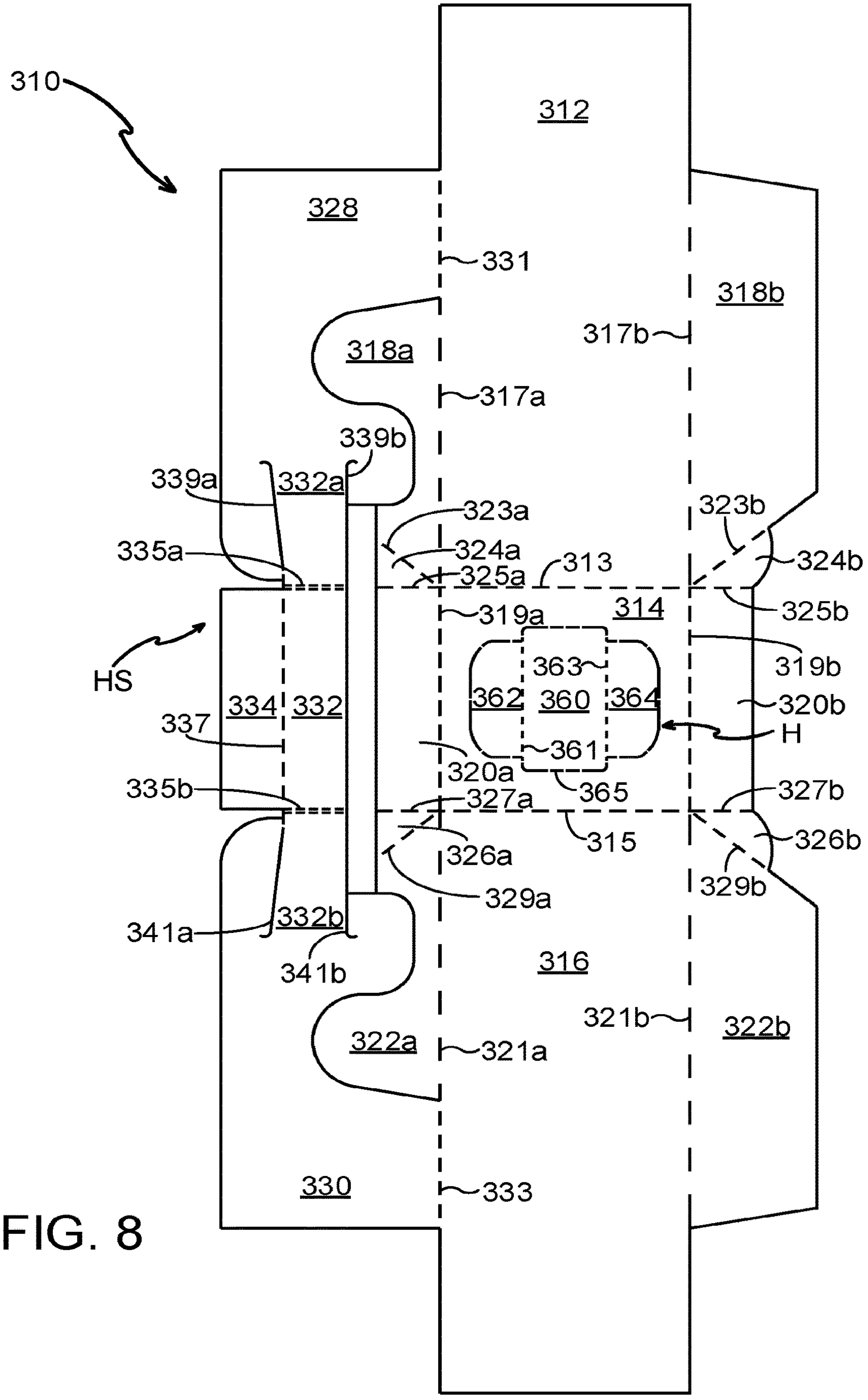
FIG. 8 is a plan view from above of a second blank for forming an article carrier according to a second embodiment.
Figure 9:
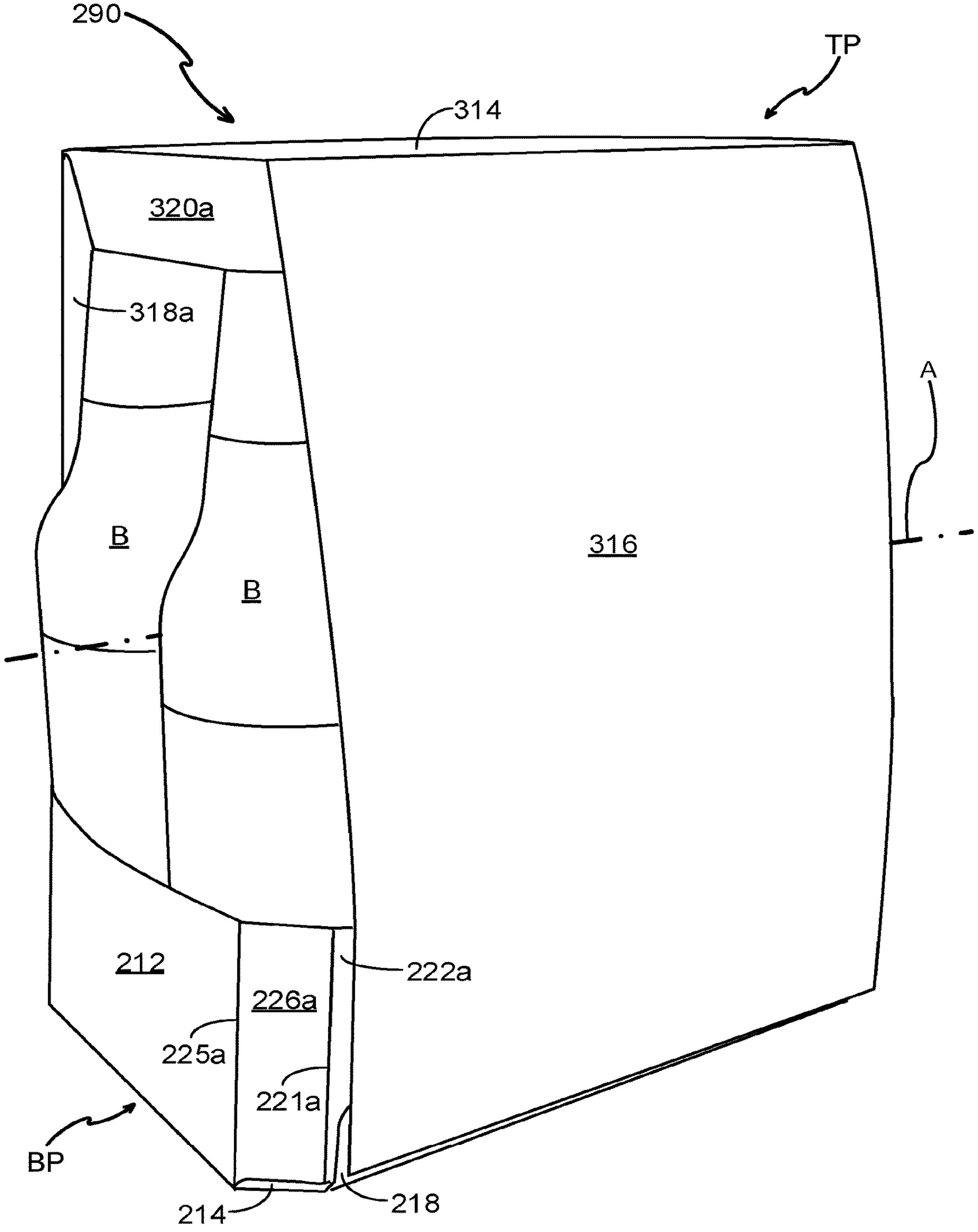
FIG. 9 is a perspective view of an article carrier formed from the blank of FIGS. 7 and 8 and loaded with a group of articles.
Figure 10A:
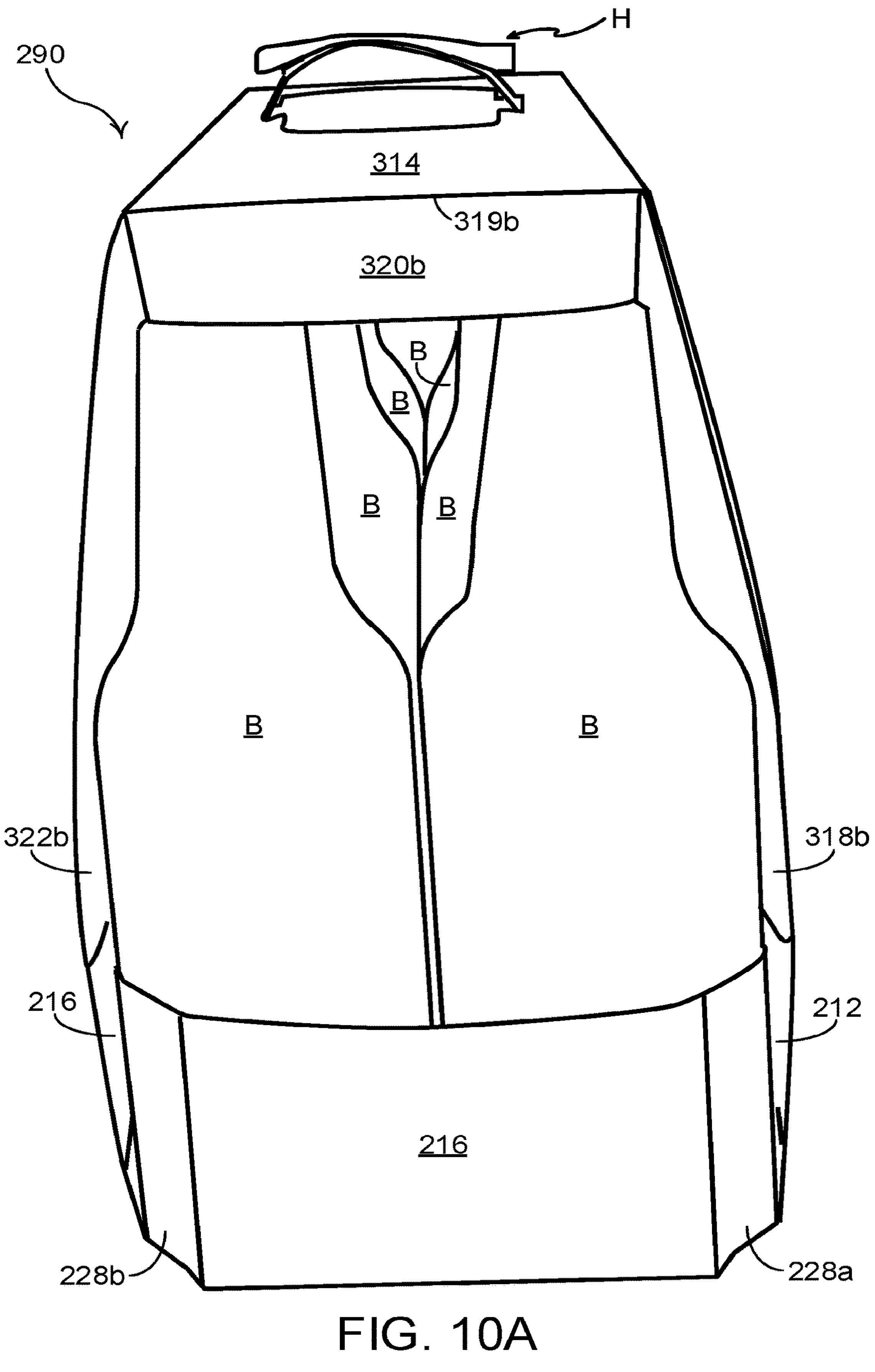
FIG. 10A is an alternative perspective view of the article carrier formed from the blank of FIGS. 7 and 8.
Figure 10B:
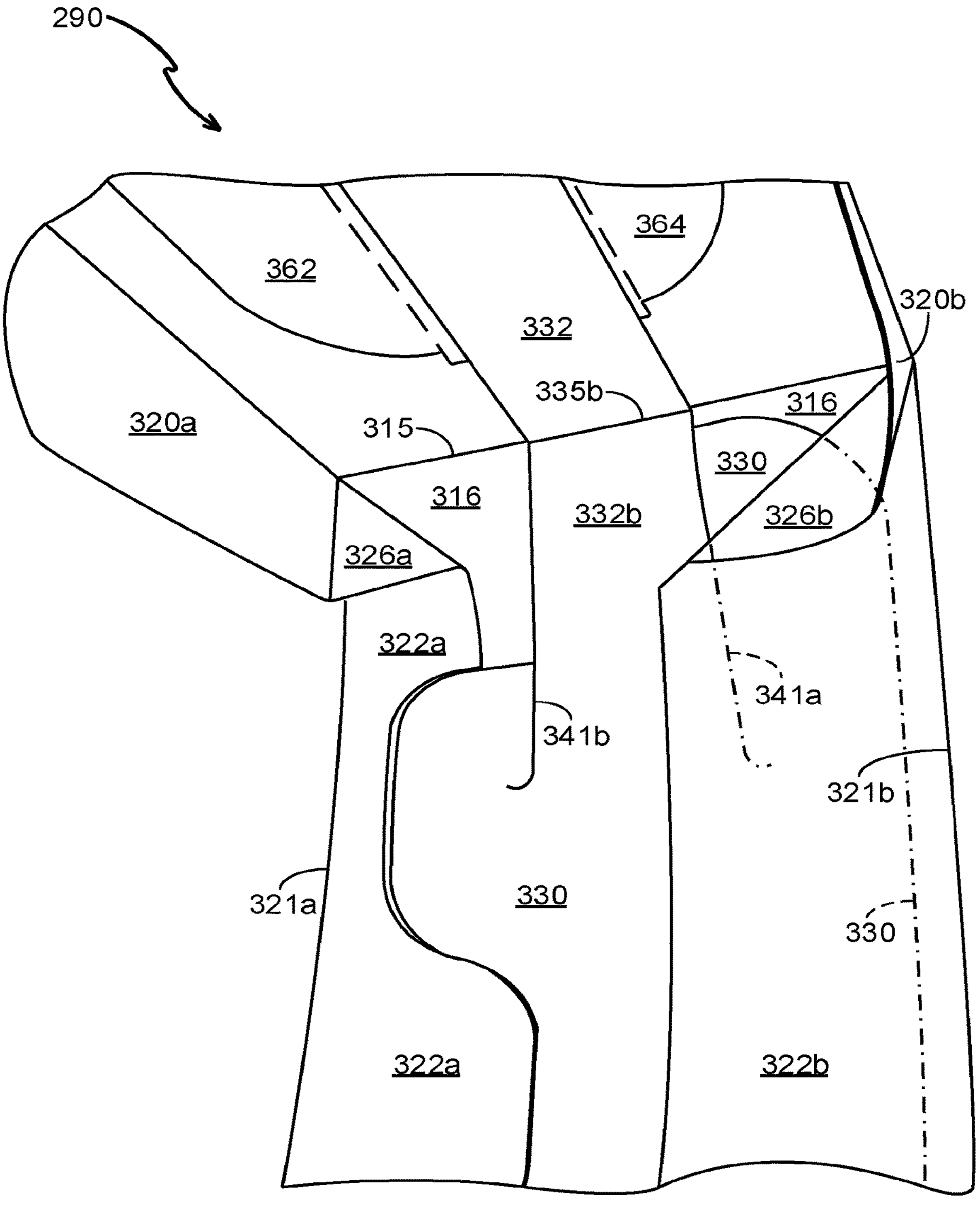
FIG. 10B illustrates an internal view of an upper portion of the article carrier of FIG. 9, the articles have been omitted for illustrative purposes.

FIGS. 7 and 8 show plan views of a first blank 210 and a second blank 310 respectively, according to another embodiment of the disclosure, capable of forming an article carrier 290, as shown in FIGS. 9, 10A and 10B.

Figure 11:
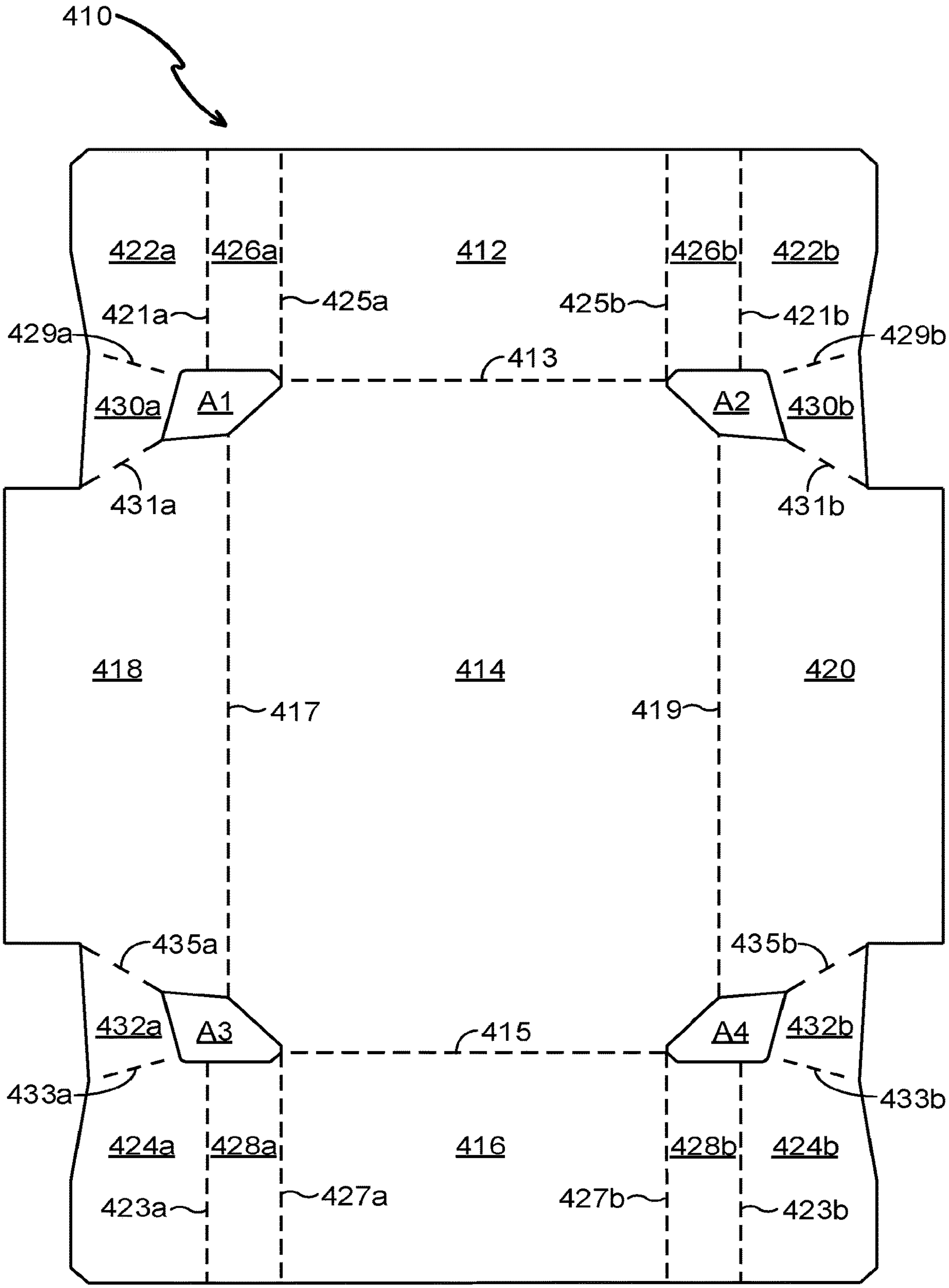
FIG. 11 is a plan view from above of a first blank for forming an article carrier according to a third embodiment.
Figure 12:
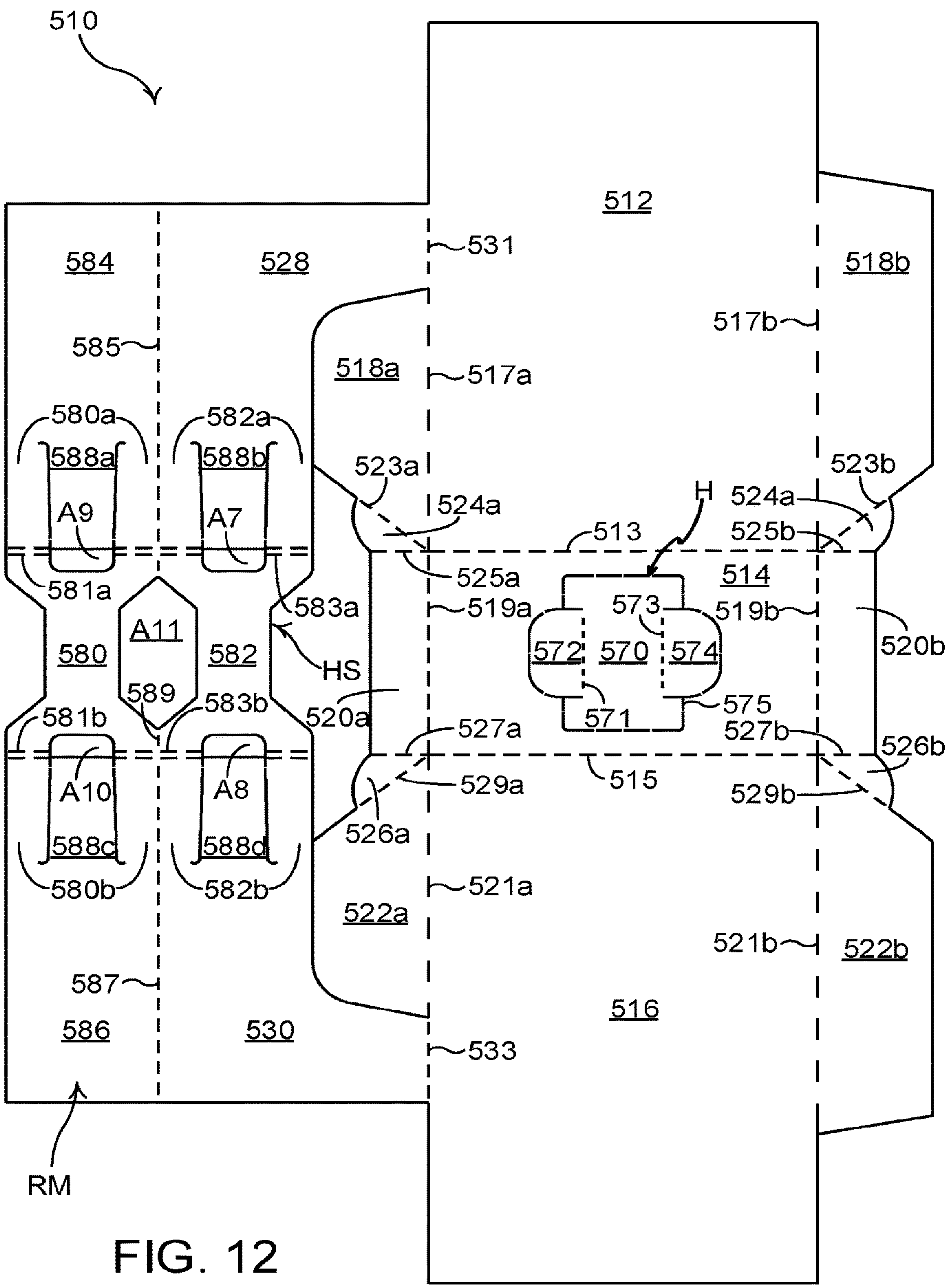
FIG. 12 is a plan view from above of a second blank for forming an article carrier according to a third embodiment.

FIGS. 11 and 12 show plan views of a first blank 410 and a second blank 510 respectively, according to yet another embodiment of the disclosure, capable of forming an article carrier (not shown).

Figure 13:
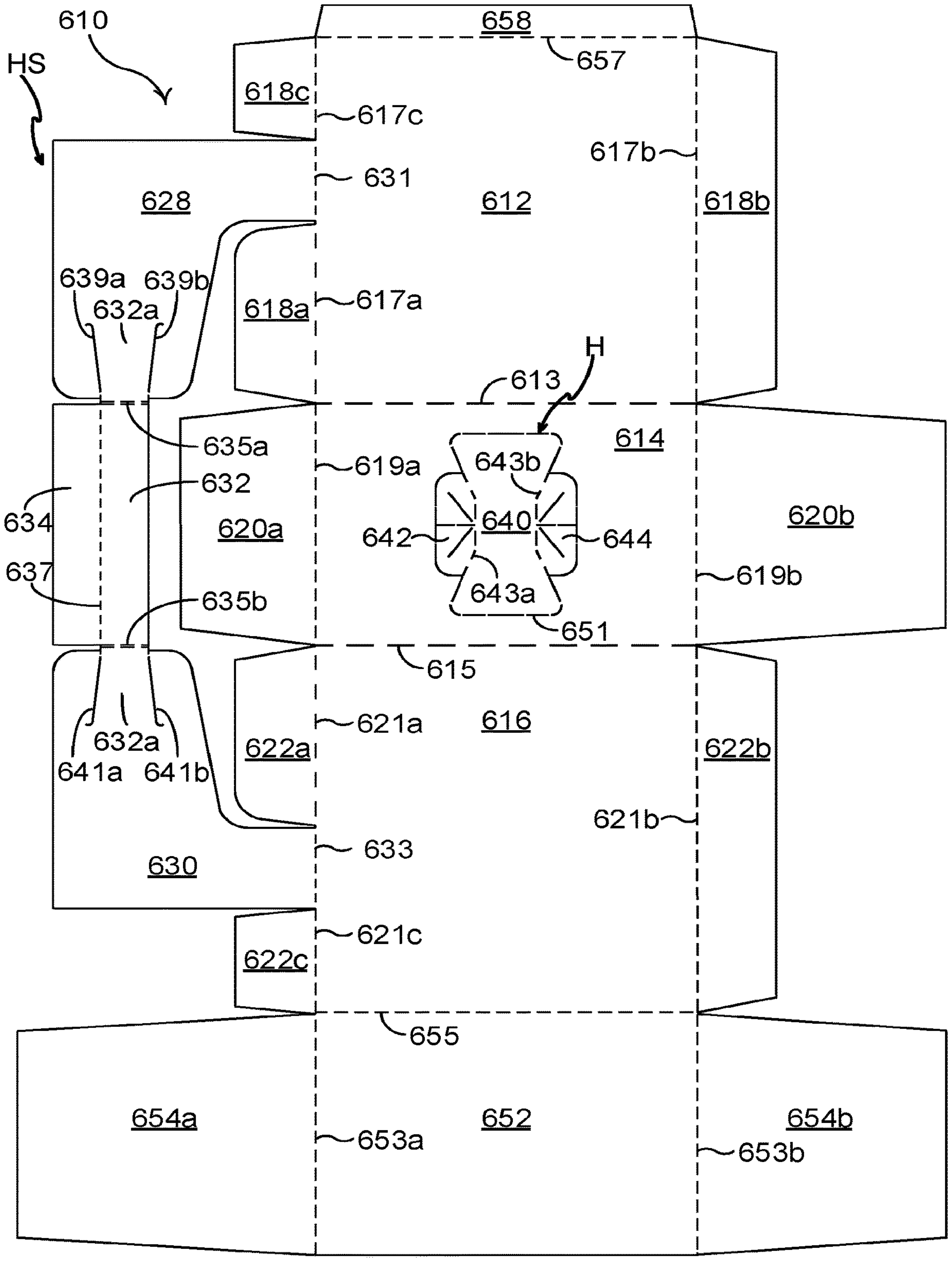
FIG. 13 is a plan view from above of a blank for forming an article carrier according to a fourth embodiment.
Figure 14:
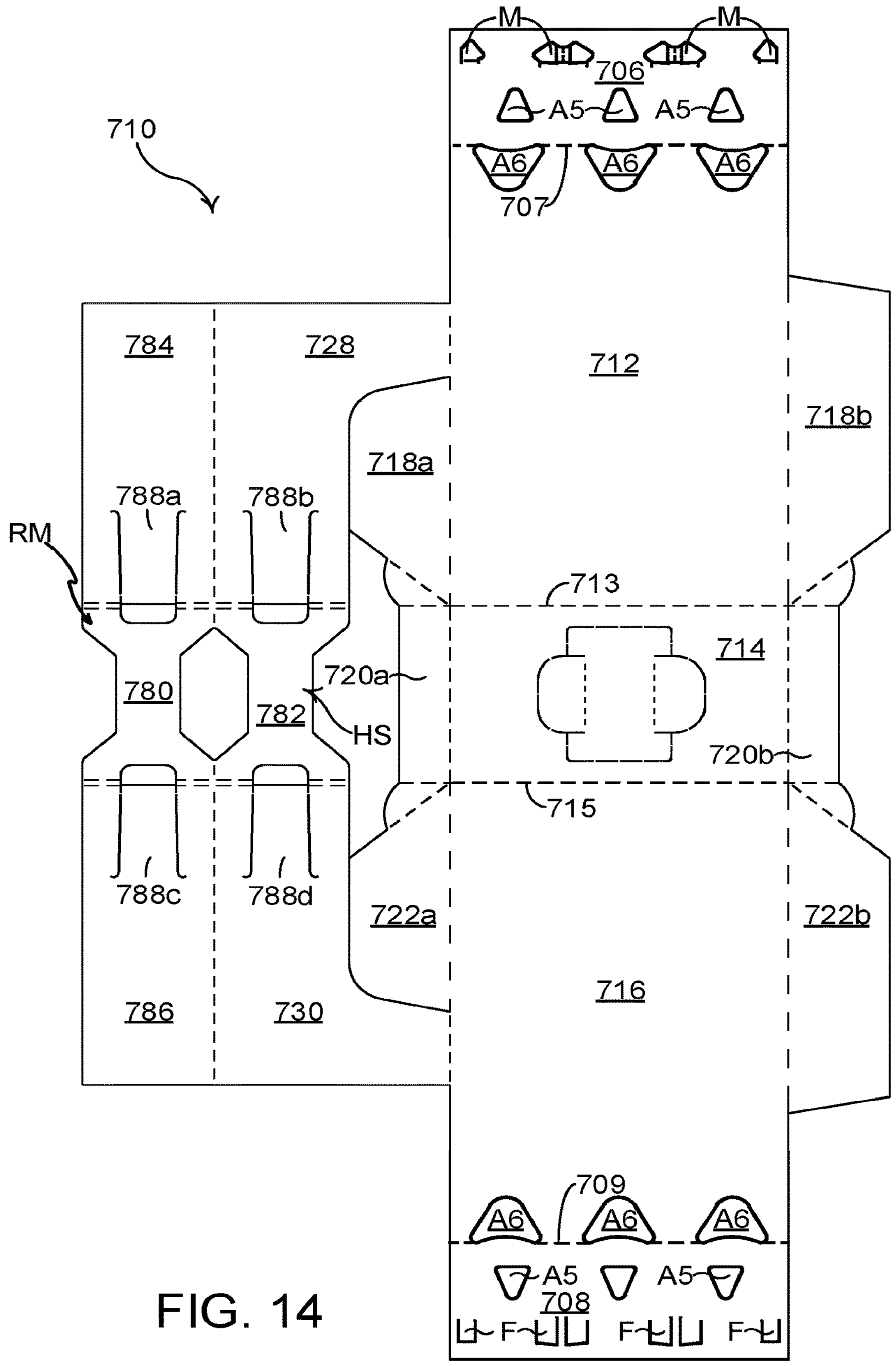
FIG. 14 is a plan view from above of a blank for forming an article carrier according to a fifth embodiment.

FIGS. 13 and 14 show plan views of blanks 610, 710, according to further embodiments of the disclosure, each blank 610, 710 capable of forming an article carrier (not shown).

Figure 15:
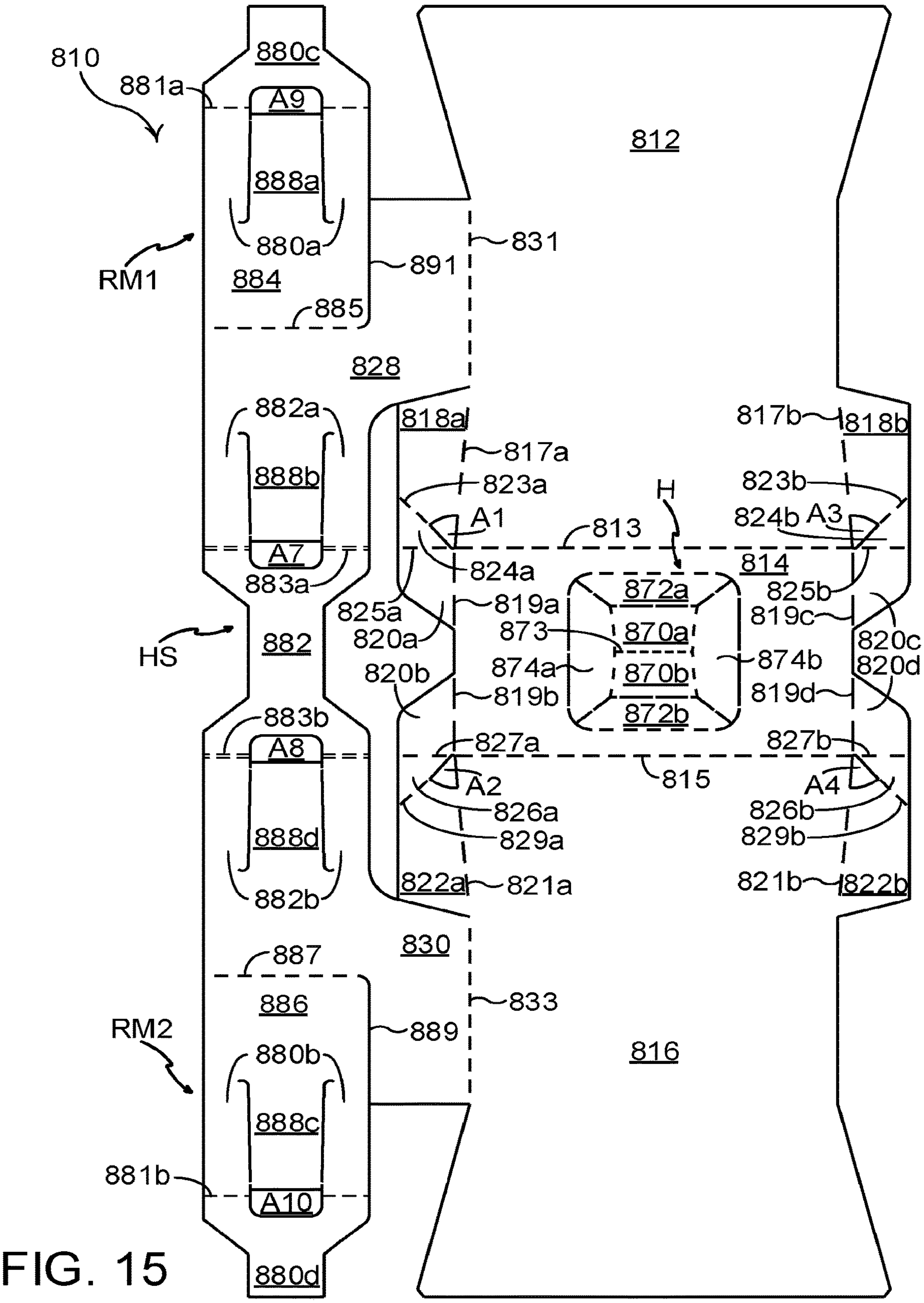
FIG. 15 is a plan view from above of a second blank for forming an article carrier according to a sixth embodiment.
Figure 16:
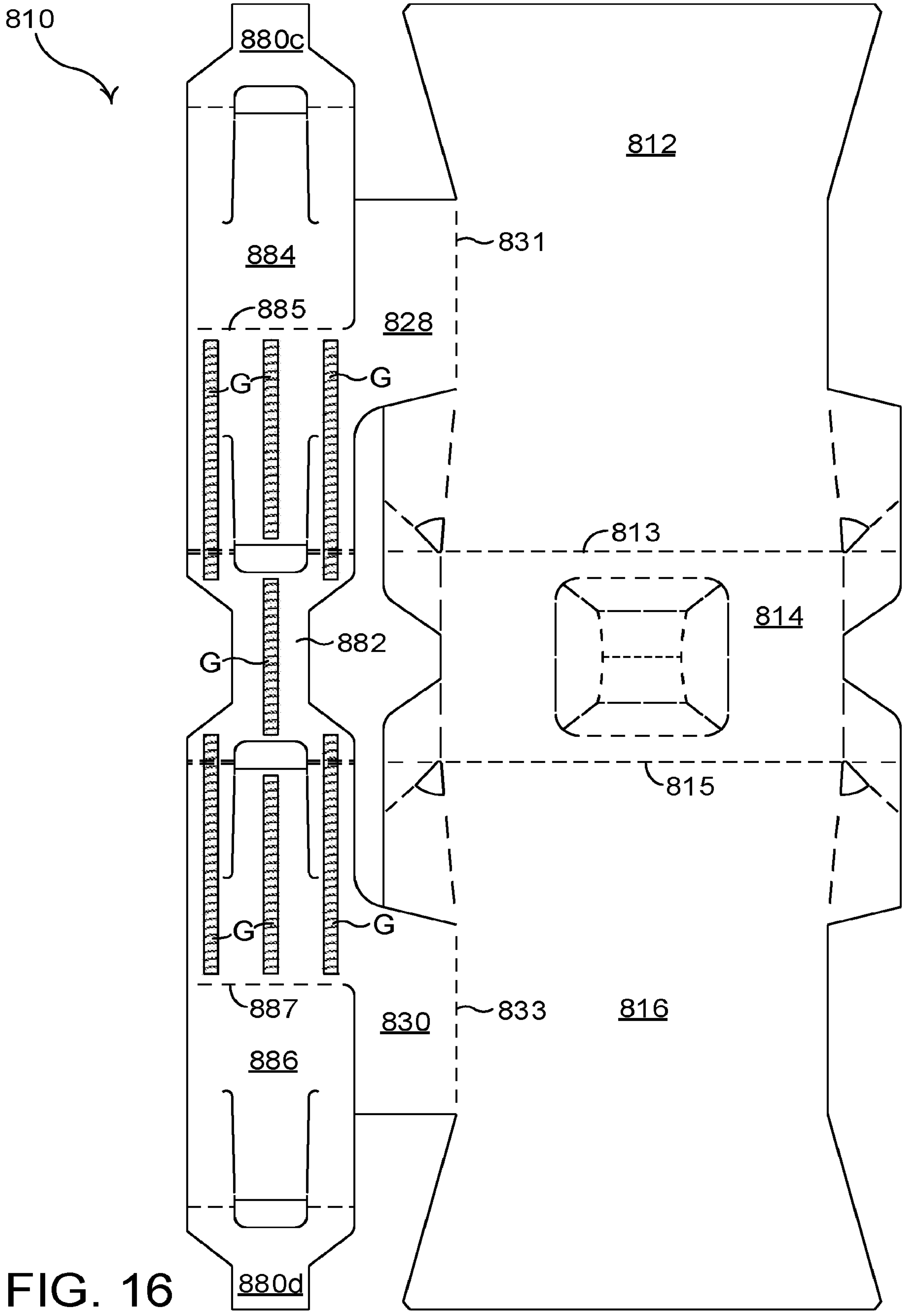
FIGS. 16 to 19 illustrate stages of construction of an article carrier from the blank of FIG. 15.

FIGS. 15 and 16 show plan views of a second blank 810, according to yet another embodiment of the disclosure, capable of forming, in combination with a blank for forming a base or tray, an article carrier (not shown).

In the embodiments detailed herein, the terms "carton" and "carrier" refer, for the non-limiting purpose of illustrating the various features of the invention, to a container 90, 290 for engaging and carrying articles B, such as primary product containers B. It is contemplated that the teachings of the invention can be applied to various product containers B, which may or may not be tapered and/or cylindrical. Exemplary containers include, but not limited to, bottles (for example metallic, glass or plastics bottles), cans (for example aluminium cans), tins, pouches, packets and the like.

The blanks 10, 110, 210, 310, 410, 510, 610, 710, 810 are formed from a sheet of suitable substrate. It is to be understood that, as used herein, the term "suitable substrate" includes all manner of foldable sheet material such as paperboard, corrugated board, cardboard, plastic, combinations thereof, and the like. It should be recognised that one or other numbers of blanks may be employed, where suitable, for example, to provide the carrier structure described in more detail below.

The article carriers 90, 290 described herein may be formed from a sheet material such as paperboard, which may be made of or coated with materials to increase its strength. An example of such a sheet material is tear-resistant NATRALOCK® paperboard made by WestRock Company. It should be noted that the tear resistant materials may be provided by more than one layer, to help improve the tear-resistance of the package. Typically, one surface of the sheet material may have different characteristics to the other surface. For example, the surface of the sheet material that faces outwardly from a finished package may be particularly smooth and may have a coating such as a clay coating or other surface treatment to provide good printability. The surface of the sheet material that faces inwardly may, on the other hand, be provided with a coating, a layer, a treatment or be otherwise prepared to provide properties such as one or more of tear-resistance, good glue-ability, heat sealability, or other desired functional properties.

The tear resistant layer may be disposed over the uncoated side of the paperboard substrate and may be formed of polymeric material and secured to the substrate. The tear resistant layer imparts toughness to the laminate structure. Suitable tear resistant materials may include, but not be limited to, tear resistant laminated sheet material, e.g., NATRALOCK®, which may include a layer of an n-axially oriented film, e.g. MYLAR®, which is a bi-axially oriented polyester, oriented nylon, cross-laminated polyolefin or high density polyolefin. The orientation and cross-laminated structure of these materials contribute to the tear resistant characteristic. Also, tear resistance may be attributed to the chemical nature of the tear resistant material such as extruded metallocene-catalysed polyethylene (mPE).

Alternatively, the tear resistant layer may be a layer of linear low-density polyethylene (LLDPE). In embodiments where linear low-density polyethylene (LLDPE) or mPE is used, it is not necessary to incorporate an adhesive layer. Other suitable materials having a high level of tear resistance may also be used.

The adhesive layer may be formed of polyolefin material such as a low density polyethylene (LDPE). The adhesive layer may be placed between the substrate and the tear resistant layer to secure the tear resistant layer to the substrate.

In the embodiment illustrated in FIGS. 1 and 2, the first and second blanks 10, 110 are configured to form a carton or carrier 90 for packaging an exemplary arrangement of exemplary articles B. In the illustrated embodiment the arrangement is an m×n matrix or array, having three rows (m=3) and four columns (n=4); in the illustrated embodiment three rows of four articles B are provided, and the articles B are 500 ml bottles, the bottles may be formed from a suitable material such as, but not limited to, glass, Aluminium or PET (polyester-polyethylene terephthalate). Alternatively, the blanks 10,110 can be configured to form a carrier for packaging other types, number and size of articles B and/or for packaging articles B in a different arrangement or configuration for example, but not limited to, fully enclosed cartons or wrap-around carriers, the articles B may be cups, pouches, pots or cans.

In the embodiment illustrated in FIGS. 7 and 8, the first and second blanks 210, 310 are configured to form a carton or carrier 290 for packaging an exemplary arrangement of exemplary articles B. In the illustrated embodiment the arrangement is an m×n matrix or array, having two rows (m=2) and two columns (n=2); in the illustrated embodiment two rows of two articles B are provided, and the articles B are 500 ml bottles, the bottles may be formed from a suitable material such as, but not limited to, glass, Aluminium or PET (polyester-polyethylene terephthalate).

In the embodiment illustrated in FIGS. 11 and 12, the first and second blanks 410, 510 are configured to form a carton or carrier (not shown) for packaging an exemplary arrangement of exemplary articles B. In the illustrated embodiment the arrangement is an m×n matrix or array, having two rows (m=2) and three columns (n=3); in the illustrated embodiment two rows of three articles B are provided, and the articles B are 500 ml bottles, the bottles may be formed from a suitable material such as, but not limited to, glass, Aluminium or PET (polyester-polyethylene terephthalate).

In the embodiment illustrated in FIG. 13, a single or unitary blank 610 is configured to form a carton or carrier (not shown) for packaging an exemplary arrangement of exemplary articles B, the carton may be of the fully enclosed type, that is to say a tubular structure surrounding an article or group of articles wherein the tubular structure is closed at each end by at least one end closure panel. The carrier may be erected to form the tubular structure and loaded with the article or group of articles through one or both ends prior to closing. In the illustrated embodiment the arrangement is an m×n matrix or array, having three rows (m=4) and four columns (n=4); in the illustrated embodiment three rows of four articles B are provided, and the articles B are 500 ml bottles, the bottles may be formed from a suitable material such as, but not limited to, glass, Aluminium or PET (polyester-polyethylene terephthalate).

In the embodiment illustrated in FIG. 14, a single or unitary blank 710 is configured to form a carton or carrier (not shown) for packaging an exemplary arrangement of exemplary articles B, the carton may be of the wrap-around type, that is to say a tubular structure folding or formed about an article or group of articles. In the illustrated embodiment the arrangement is an m×n matrix or array, having three rows (m=4) and four columns (n=4); in the illustrated embodiment three rows of four articles B are provided, and the articles B are 500 ml bottles, the bottles may be formed from a suitable material such as, but not limited to, glass, Aluminium or PET (polyester-polyethylene terephthalate).

In the embodiment illustrated in FIG. 15, the second blank 810 is configured to form a carton or carrier (not shown) in combination with a suitable base or tray for packaging an exemplary arrangement of exemplary articles B. In the illustrated embodiment the arrangement is an m×n matrix or array, having two rows (m=2) and three columns (n=3); in the illustrated embodiment two rows of three articles B are provided, and the articles B are 500 ml bottles, the bottles may be formed from a suitable material such as, but not limited to, glass, Aluminium or PET (polyester-polyethylene terephthalate).

Turning to FIG. 1, there is illustrated a first blank 10 for forming an article carrier 90 (see FIG. 6) according to a first embodiment. The blank 10 comprises a plurality of panels 12, 14, 16, 18, 20 for forming a base or tray BP. The plurality of main panels 12, 14, 16, 18, 20 comprises a base panel 14, a first lower end closure flap 12, a second lower end closure flap 16, a first side flap 18 (or inner side wall) and a second side flap 20 (or inner side wall).

The first lower end closure flap 12 is hingedly connected to a first end edge of the base panel 14 by a hinged connection in the form of a fold line 13. The second lower end closure flap 16 is hingedly connected to a second, opposing end edge of the base panel 14 by a hinged connection in the form of a fold line 15. The first side flap 18 is hingedly connected to a first side edge of the base panel 14 by a hinged connection in the form of a fold line 17, the first side edge is disposed adjacent to the first and second end edges. The second side flap 20 is hingedly connected to a second side edge of the base panel 14 by a hinged connection in the form of a fold line 19, the second side edge is disposed opposite to the first side edge and adjacent to the first and second end edges.

A first side securing panel **22*a* is coupled to at least one of the first lower end closure flap 12 and the first side flap 18 by a hinged connection, either directly by a fold line or indirectly by virtue of a hinged connection to an interconnecting panel 26*a*, 30*a*. The first side securing panel 22*a* facilitates securing the first lower end closure flap 12 to the first side flap 18 so as to form upstanding walls from the base panel 14**.

The first lower end closure flap 12 may be coupled to the first side flap 18. An optional first bevel panel **26*a* may be hingedly connected to a first edge of the first lower end closure flap 12 by a hinged connection in the form of a fold line 25*a*. The first side securing panel 22*a* may be hingedly connected to the first bevel panel 26*a* by a hinged connection in the form of a fold line 21*a*. In other embodiments the first side securing panel 22*a* may be hingedly connected to the first lower end closure flap 12**.

A first web panel **30*a* may be hingedly connected to the first side securing panel 22*a* by a hinged connection in the form of a fold line 29*a*. The first web panel 30*a* may be hingedly connected to the first side flap 18 by a hinged connection in the form of a fold line 31*a*. In some embodiments, the first side securing panel 22*a* may be hingedly connected to the first side flap 18**.

A cutaway in the form of a first aperture A1 separates the first bevel panel **26*a* from the base panel 14, the first side securing panel 22*a* from the base panel 14 and the first web panel 30*a* from the base panel 14. The first aperture A1 creates a first mitred or chamfered corner of the base panel 14. The first aperture A1 intersects or terminates the fold line 13 and the fold line 17**.

A second side securing panel **22*b* is coupled to at least one of the first lower end closure flap 12 and the second side flap 20 by a hinged connection, either directly by a fold line or indirectly by virtue of a hinged connection to an interconnecting panel 26*b*, 30*b*. The second side securing panel 22*b* facilitates securing the first lower end closure flap 12 to the second side flap 20 so as to form upstanding walls from the base panel 14**.

The first lower end closure flap 12 may be coupled to the second side flap 20. An optional second bevel panel **26*b* may be hingedly connected to a second edge of the first lower end closure flap 12 by a hinged connection in the form of a fold line 25*b*. The second side securing panel 22*b* may be hingedly connected to the second bevel panel 26*b* by a hinged connection in the form of a fold line 21*b*. In other embodiments the second side securing panel 22*b* may be hingedly connected to the first lower end closure flap 12**.

A second web panel **30*b* may be hingedly connected to the second side securing panel 22*b* by a hinged connection in the form of a fold line 29*b*. The second web panel 30*b* may be hingedly connected to the second side flap 20 by a hinged connection in the form of a fold line 31*b*. In some embodiments, the second side securing panel 22*b* may be hingedly connected to the second side flap 20**.

A cutaway in the form of a second aperture A2 separates the second bevel panel **26*b* from the base panel 14, the second side securing panel 22***b* from the base panel 14 and the second web panel 30*b* from the base panel 14. The second aperture A2 creates a second mitred or chamfered corner of the base panel 14. The second aperture A2 intersects or terminates the fold line 13 and the fold line 19.

A third side securing panel 24*a* is coupled to at least one of the second lower end closure flap 16 and the first side flap 18 by a hinged connection, either directly by a fold line or indirectly by virtue of a hinged connection to an interconnecting panel 28*a*, 32*a*. The third side securing panel 24*a* facilitates securing the second lower end closure flap 16 to the first side flap 18 so as to form upstanding walls from the base panel 14.

The second lower end closure flap 16 may be coupled to the first side flap 18. An optional third bevel panel 28*a* may be hingedly connected to a first edge of the second lower end closure flap 16 by a hinged connection in the form of a fold line 27*a*. The third side securing panel 24*a* may be hingedly connected to the third bevel panel 28*a* by a hinged connection in the form of a fold line 23*a*. In other embodiments the third side securing panel 24*a* may be hingedly connected to the second lower end closure flap 16.

A third web panel 32*a* may be hingedly connected to the third side securing panel 24*a* by a hinged connection in the form of a fold line 33*a*. The third web panel 32*a* may be hingedly connected to the first side flap 18 by a hinged connection in the form of a fold line 35*a*. In some embodiments, the third side securing panel 24*a* may be hingedly connected to the first side flap 18.

A cutaway in the form of a third aperture A3 separates the third bevel panel 28*a* from the base panel 14, the third side securing panel 24*a* from the base panel 14 and the third web panel 32*a* from the base panel 14. The third aperture A3 creates a third mitred or chamfered corner of the base panel 14. The third aperture A3 intersects or terminates the fold line 15 and the fold line 17.

A fourth side securing panel 24*b* is coupled to at least one of the second lower end closure flap 16 and the second side flap 20 by a hinged connection, either directly by a fold line or indirectly by virtue of a hinged connection to an interconnecting panel 28*b*, 32*b*. The fourth side securing panel 24*b* facilitates securing the second lower end closure flap 16 to the second side flap 20 so as to form upstanding walls from the base panel 14.

The second lower end closure flap 16 may be coupled to the second side flap 20. An optional fourth bevel panel 28*b* may be hingedly connected to a second edge of the second lower end closure flap 16 by a hinged connection in the form of a fold line 27*b*. The fourth side securing panel 24*b* may be hingedly connected to the fourth bevel panel 28*b* by a hinged connection in the form of a fold line 23*b*. In other embodiments the fourth side securing panel 24*b* may be hingedly connected to the second lower end closure flap 16.

A fourth web panel 32*b* may be hingedly connected to the fourth side securing panel 24*b* by a hinged connection in the form of a fold line 33*b*. The fourth web panel 32*b* may be hingedly connected to the second side flap 20 by a hinged connection in the form of a fold line 35*b*. In some embodiments, the fourth side securing panel 24*b* may be hingedly connected to the second side flap 18.

A cutaway in the form of a fourth aperture A4 separates the fourth bevel panel 28*b* from the base panel 14, the fourth side securing panel 24*b* from the base panel 14 and the fourth web panel 32*b* from the base panel 14. The fourth aperture A4 creates a fourth mitred or chamfered corner of the base panel 14. The fourth aperture A4 intersects or terminates fold line 15 and fold line 19.

The second blank 110 comprises a plurality of main panels 112, 114, 116 for forming a top part or cover TP. The plurality of main panels 112, 114, 116 comprises a first side panel 112 (or outer side wall), a top panel 114, a second side panel 116 (or outer side wall). The plurality of panels 112, 114, 116 may be arranged in a linear series hinged one to the next by corresponding fold lines 113, 115.

The second blank 110 comprises an end closure structure for partially closing each end of the article carrier 90.

A first end closure structure comprises a first top end closure panel 120*a* hingedly connected to the top panel 114 by a hinged connection in the form of a fold line 119*a*. The first end closure structure comprises a first anchor panel 118*a* hingedly connected to a first edge of the first side panel 112 by a hinged connection in the form of a fold line 117*a*. The first top end closure panel 120*a* is coupled to the first anchor panel 118*a* by a first gusset panel 124*a*. The first gusset panel 124*a* is hingedly connected to the first top end closure panel 120*a* by a hinged connection in the form of a fold line 125*a*. The first gusset panel 124*a* is hingedly connected to the first anchor panel 118*a* by a hinged connection in the form of a fold line 123*a*.

The first end closure structure comprises a second anchor panel 122*a* hingedly connected to a first edge of the second side panel 116 by a hinged connection in the form of a fold line 121*a*. The first top end closure panel 120*a* is coupled to the second anchor panel 122*a* by a second gusset panel 126*a*. The second gusset panel 126*a* is hingedly connected to the first top end closure panel 120*a* by a hinged connection in the form of a fold line 127*a*. The second gusset panel 126*a* is hingedly connected to the second anchor panel 122*a* by a hinged connection in the form of a fold line 129*a*.

A second end closure structure comprises a second top end closure panel 120*b* hingedly connected to the top panel 114 by a hinged connection in the form of a fold line 119*b*. The second end closure structure comprises a third anchor panel 118*b* hingedly connected to a second edge of the first side panel 112 by a hinged connection in the form of a fold line 117*b*. The second top end closure panel 120*b* is coupled to the third anchor panel 118*b* by a third gusset panel 124*b*. The third gusset panel 124*b* is hingedly connected to the second top end closure panel 120*b* by a hinged connection in the form of a fold line 125*b*. The third gusset panel 124*b* is hingedly connected to the third anchor panel 118*b* by a hinged connection in the form of a fold line 123*b*.

The second end closure structure comprises a fourth anchor panel 122*b* hingedly connected to a second edge of the second side panel 116 by a hinged connection in the form of a fold line 121*b*. The second top end closure panel 120*b* is coupled to the fourth anchor panel 122*b* by a second gusset panel 126*b*. The fourth gusset panel 126*b* is hingedly connected to the second top end closure panel 120*b* by a hinged connection in the form of a fold line 127*b*. The fourth gusset panel 126*b* is hingedly connected to the fourth anchor panel 122*b* by a hinged connection in the form of a fold line 129*b*.

The second blank 110 comprises a carrying handle structure HS. The carrying handle structure HS comprises a handle strap 132/132*a*/132*b* hingedly connected to a side edge of the plurality of main panels 112, 114, 116 and a handle opening defined in the top panel 114, optionally the handle opening is defined by a handle panel or feature H struck, at least, from the top panel 114 and defined by a cutline or severable line 151. The handle panel H may comprise a grip panel 140, which is optionally bow-tie shaped. The handle panel H may comprise a cushioning flap 142, 144 hinged to opposing side edges of the grip panel 140 by a hinged connection in the form of fold lines 143*a*, 143*b* respectively. Each cushioning flap 142, 144 may comprise at least one fold line 145*a*, 147*a*, 145*b*, 147*b* for facilitating folding of the cushioning flaps 142, 144. Each cushioning flap 142, 144 may comprise a cutline or severance line 149*a*, 149*b* for facilitating division of the cushioning flaps 142, 144 into two parts each hinged to their respective side edge of the grip panel 140.

The handle strap 132/132*a*/132*b* comprises a central portion 132; a first end of the central portion 132 is hinged to, or integral with a first connecting panel 128 and a second end of the central portion 132 is hinged to, or integral with a second connecting panel 130.

The first connecting panel 128 is hinged to a first side edge of the first side panel 112 by a hinged connection in the form of a fold line 131. The second connecting panel 130 is hinged to a first side edge of the second side panel 116 by a hinged connection in the form of a fold line 133.

The central portion 132 may be hinged to a first end portion 132*a* by a hinged connection in the form of a fold line or pair of fold lines 135*a*. The first end portion 132*a* is formed from, or struck from, the first connecting panel 128. The first end portion 132*a* is defined in part by a pair of cut lines or severable lines 139*a*, 139*b* defined in the first connecting panel 128. The pair of cut lines 139*a*, 139*b* may be divergently arranged with respect to each other. The pair of cut lines 139*a*, 139*b* converge towards the central portion 132.

The central portion 132 may be hinged to a second end portion 132*b* by a hinged connection in the form of a fold line or pair of fold lines 135*b*. The second end portion 132*b* is formed from, or struck from, the second connecting panel 130. The second end portion 132*b* is defined in part by a pair of cut lines or severable lines 141*a*, 141*b* defined in the second connecting panel 130. The pair of cut lines 141*a*, 141*b* may be divergently arranged with respect to each other. The pair of cut lines 141*a*, 141*b* converge towards the central portion 132.

The cut lines 139*a*, 139*b*, 141*a*, 141*b* may terminate in a 'J' or 'C" shaped cutline.

The grain direction GD of the substrate forming the carton is shown in FIG. 2 and in FIG. 6, the grain directions GD extends transversely with respect to a tubular axis A of the tubular structure or such that the grain direction extends from a top edge, defined by fold lines 113, 115, of the side panels 112, 116 to a bottom edge of the side panels 112, 116 of the blank; the bottom edge opposes the top edge.

The carrying handle is arranged so as to extend transversely of the tubular axis A of the tubular structure. The handle structure HS is arranged such that the grain direction GD of the substrate extends longitudinally, between the end portions 132*a*, 132*b*, along the handle strap 132/132*a*/132*b*.

Optionally, the handle structure HS comprises a reinforcing panel 134, the reinforcing panel 134 is hingedly connected to the central portion 132 by a hinged connection in the form of a fold line 137.

The fold lines 117*a*, 117*b* are disposed between the fold lines 131, 133. The fold line 117*a* is disposed contiguous with the fold line 131. The fold line 117*a* is disposed collinear with the fold line 131. The fold line 117*b* is disposed contiguous with the fold line 133. The fold line 117*b* is disposed collinear with the fold line 133.

The fold lines 131, 133 may be arranged to provide less folding resistance than the fold lines 117*a*, 117*b*, that is to say they may be more easily folded.

Turning to the construction of the package as illustrated in FIG. 6, the article carrier 90 can be formed by a series of sequential folding operations. The folding process is not limited to that described below and may be altered according to particular manufacturing requirements.

Glue or other adhesive treatment is applied to each of the first, second, third and fourth side securing panels 22*a*, 22*b*, 24*a*, 24*b*. In other embodiments the glue may be applied to a corresponding regions of an inner surface of the first and second side flaps 18, 20.

The first blank 10 is folded about fold line 13 and fold line 15 such that the first lower end closure flap 12 and the second lower end closure flap 20 are brought into substantially perpendicular relationship with respect to the base panel 14. In response, the first and second side flaps 18, 20 are simultaneously folded about fold line 17, 19 respectively. The first, second, third and fourth side securing panels 22*a*, 22*b*, 24*a*, 24*b* are folded so as to be disposed in face contacting relationship with a respective one of the first and second side flaps 18, 20. In doing so the first and second bevel panels 26*a*, 26*b*, 28*a*, 28*b* are folded so as to extend between one of the first and second lower end closure flaps 12, 16 and an adjacent one of the first and second side flaps 18, 20. In this way a tray is formed with an open upper end.

Figure 3:
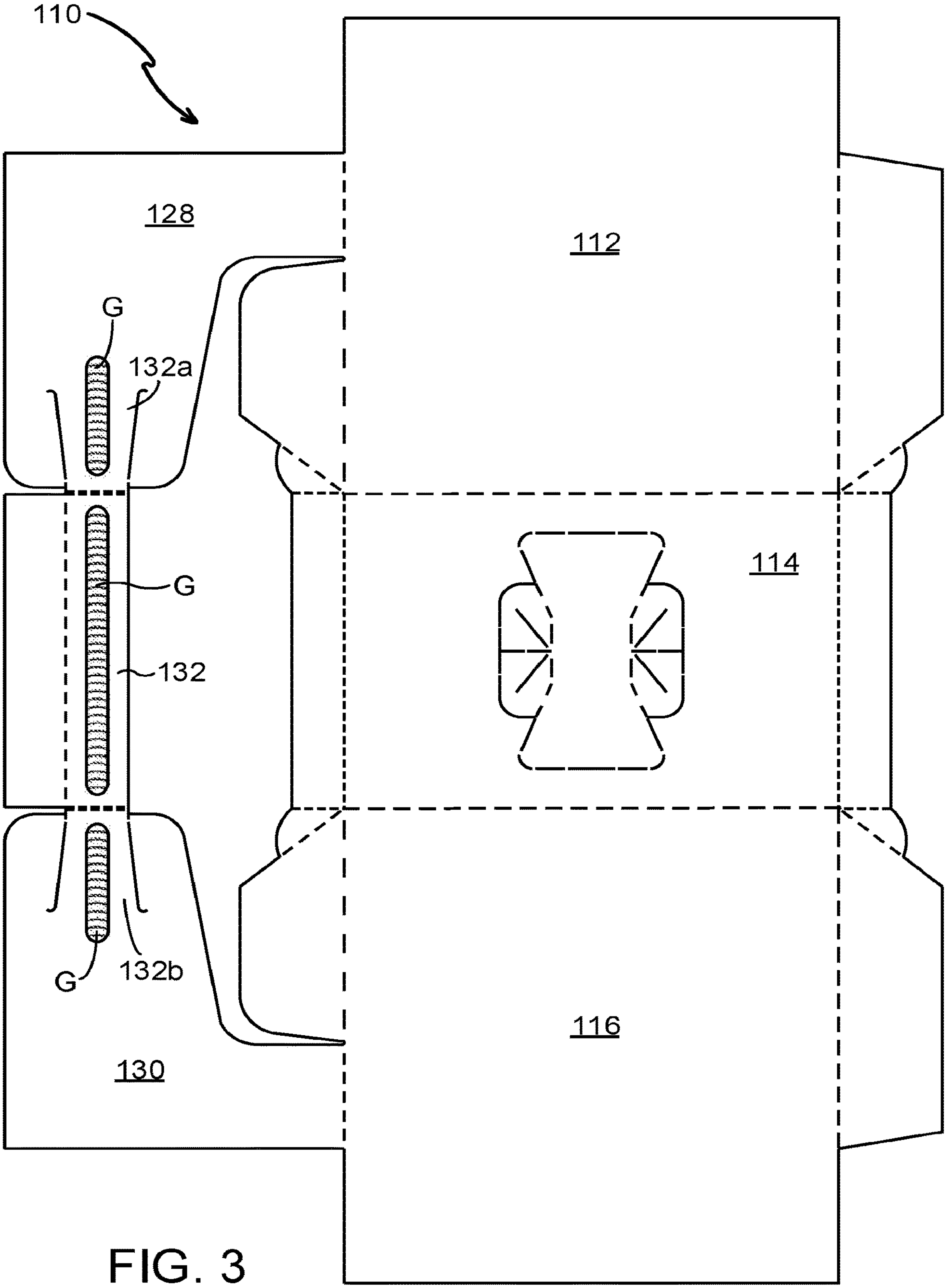
FIGS. 3 to 5C illustrate stages of construction of an article carrier from the blank of FIG. 1.
Figure 4:
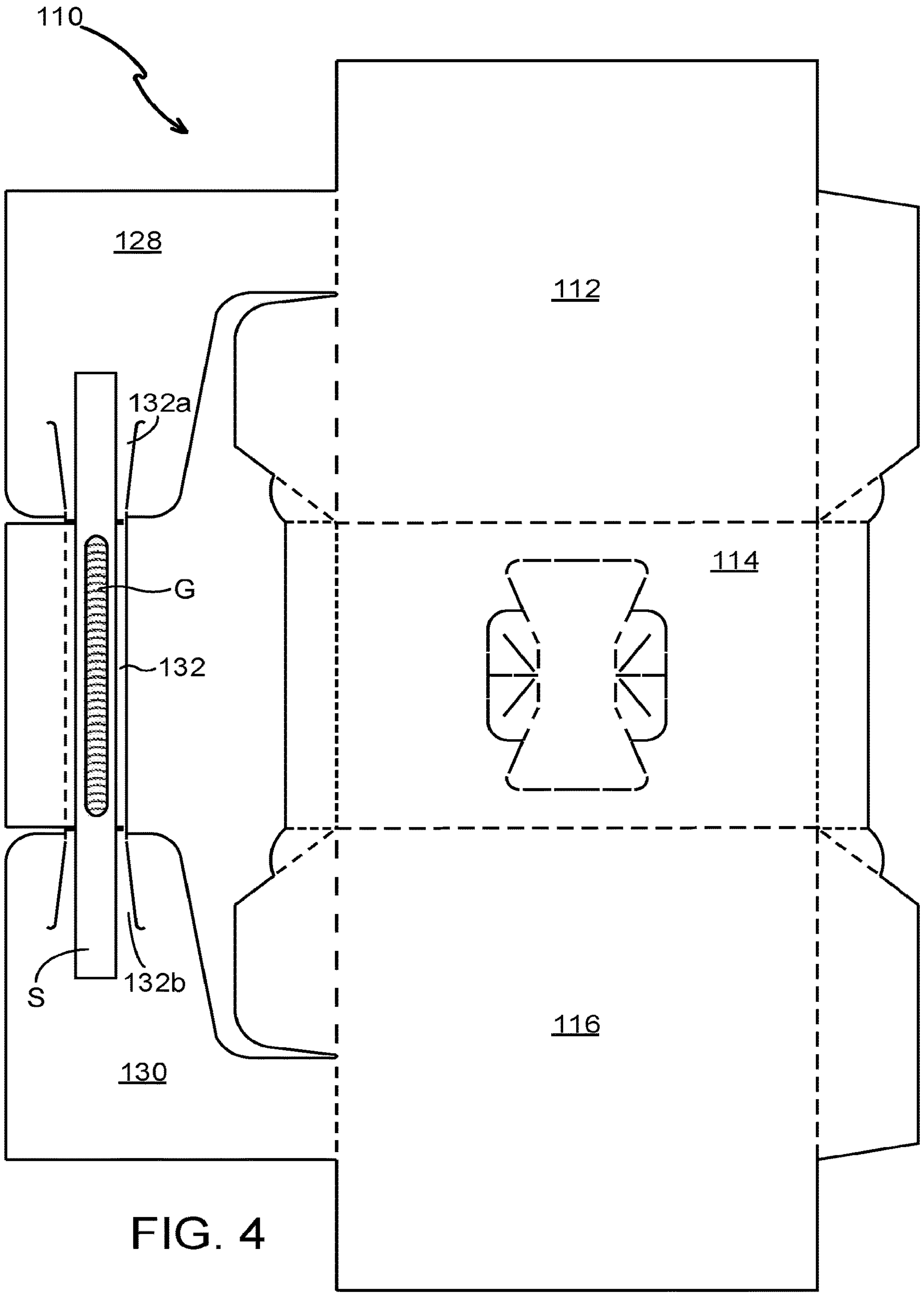

Referring now to FIG. 3, glue G or other adhesive treatment is applied to the handle strap 132/132*a*/132*b*, glue G is applied to the central portion 132 and to each of the first and second end portions 132*a*, 132*b*. A reinforcing strap S is then placed into face contacting relationship with the handle strap 132/132*a*/132*b* as shown in FIG. 4. The reinforcing strap S is secured to the handle strap 132/132*a*/132*b*. The reinforcing strap S may be formed from paperboard or a plastics material.

Glue G or other adhesive treatment is applied to a portion of the reinforcing strap S overlying the central portion 132 of the handle strap 132/132*a*/132*b*, as shown in FIG. 4.

Figure 5C:
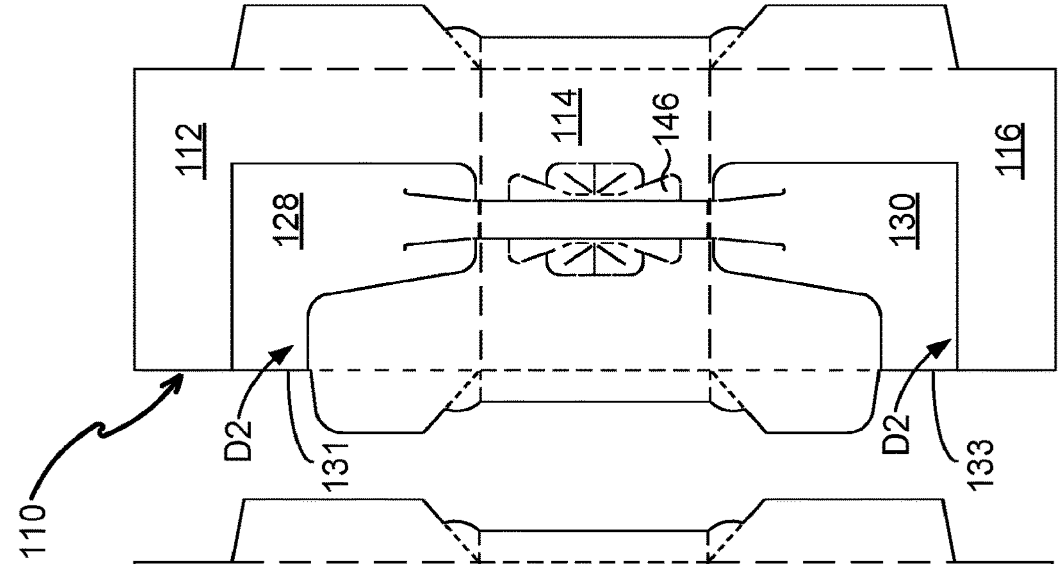
Figure 5B:
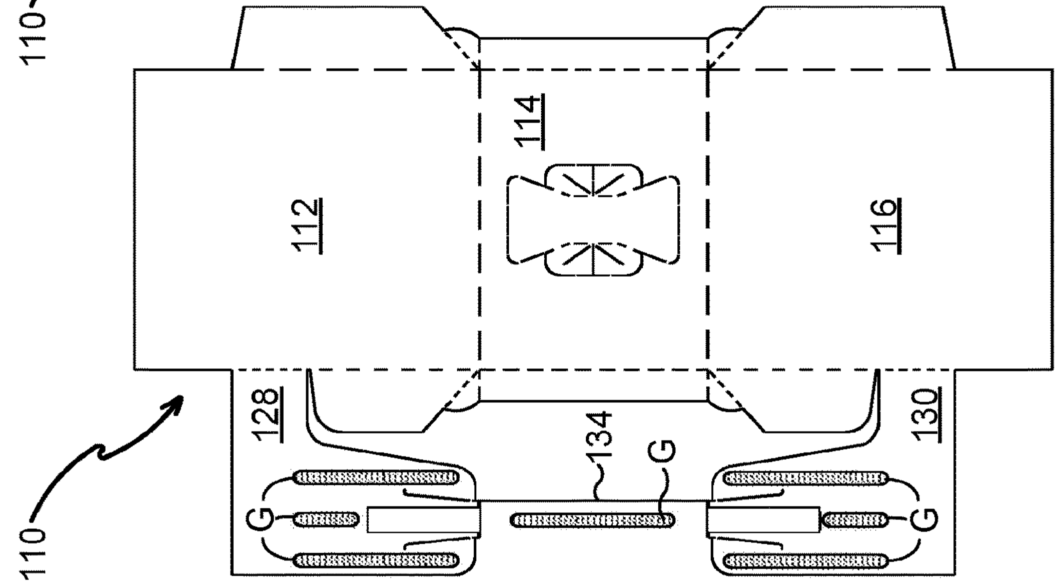
Figure 5A:
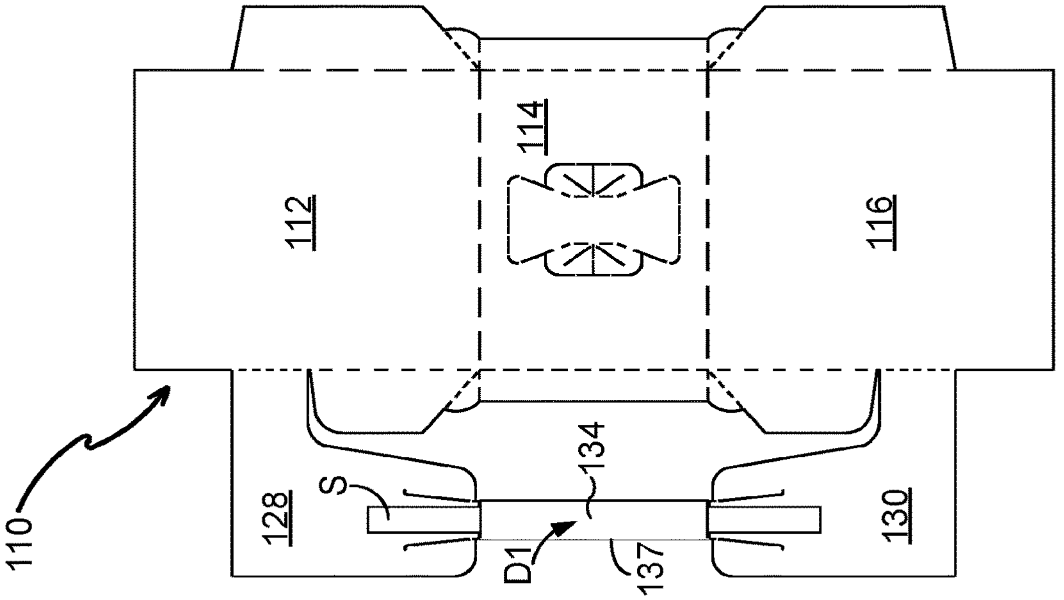

The second blank 110 is folded about fold line 137, as indicated by direction arrow D1 in FIG. 5A, such that the reinforcing panel 134 overlies the reinforcing strap S and the central portion 132 of the handle strap 132/132*a*/132*b*. The reinforcing strap S is disposed between the reinforcing panel 134 and the central portion 132 of the handle strap 132/132*a*/132*b*.

Glue G or other adhesive treatment is applied to the first connecting panel 128 and to the second connecting panel 130, as shown in FIG. 5B. Regions of connecting panels 128, 130 defined by the first and second end portions 132*a*, 132*b* are free from glue or adhesive.

The second blank 110 is folded about fold lines 131, 133, as indicated by direction arrows D2 in FIG. 5C, such that the first connecting panel 128 overlies the first side panel 112 and the second connecting panel 130 overlies the second side panel 116. The first connecting panel 128 is disposed in face contacting relationship with the first side panel 112. The first connecting panel 128 is secured to the first side panel 112. The second connecting panel 130 is disposed in face contacting relationship with the second side panel 116. The second connecting panel 130 is secured to the second side panel 116. The central portion 132 is secured to the grip panel 140 of the handle panel H.

Glue G or other adhesive treatment is applied to the reinforcing panel 134 or to the grip panel 140 prior to folding first and second connecting panels 128, 130 about fold line 132, 133.

The reinforcing panel 134 is secured to the grip panel 140.

The tray BP (see FIG. 6) is loaded with a group of articles B.

Glue or other adhesive treatment is applied to the first side flap 18 and to the second side flap 20, in alternative embodiments the glue may be applied to corresponding regions of the inner surface of the first and second side panels 112, 116 of the second blank 110.

The second blank 110 of FIG. 5C is folded about an upper end of the group of articles B. The first and second side panels 112, 116 are folded about with respect to the top panel 114 about fold lines 113, 115 respectively.

The first, second, third and fourth anchor panels 118*a*, 122*a*, 118*b*, 122*b* are folded into face contacting relationship with the respective one of the first and second side panels 112, 116 to which they are hinged. In response the first and second top end closure panels 120*a*, 120*b* are automatically folded about their respective hinged connections 119*a*, 119*b* to the top panel 114.

The first and second side panels 112, 116 are disposed in face contacting relationship with the first and second side flaps 18, 20 respectively. The first side panel 112 is secured to the first side flaps 18. The second side panel 116 is secured to the second side flap 20. The first and second side panels 112, 116 form outer side walls of the article carrier 90. The first and second side flaps 18, 20 form inner side walls of the article carrier 90. The side walls 18/112, of the article carrier 90 are composite in structure; the side walls 18/112, 20/116 comprise an inner layer 18, 20 and an outer layer 112, 116.

FIG. 6 shows an assembled article carrier 90. The article carrier comprises a tubular structure defined in part by the tray BP and in part by the top part TP. The tubular structure comprises a tubular axis A, the first and second side panels 112, 116 are disposed transversely to the tubular axis A.

The tubular structure comprises first and second ends, the first end is partially closed by the first lower end closure flap 12 and the first top end closure panel 120*a*, the second end is partially closed by the second lower end closure flap 16 and the second top end closure panel 120*b*.

Each of first and second ends comprises a display or viewing window through which portion of the articles B are visible. The endmost articles B adjacent the display window may oriented in a predefined direction such that a desired aspect or face of the articles B is adjacent the display window and is prominently displayed.

Referring now to FIGS. 7 to 10B there is shown an alternative embodiment of the present disclosure. In the second illustrated embodiment, like numerals have, where possible, been used to denote like parts, albeit with the addition of the prefixes "200" and "300" to indicate that these features belong to the second embodiment. The second embodiment shares many common features with the embodiment of FIGS. 1 to 6, therefore only the differences from the embodiment illustrated in FIGS. 1 to 6 will be described in any greater detail.

FIG. 7 shows a first blank 210 for forming an article carrier 290 (see FIGS. 9, 10A and 10B) according to a second embodiment. The blank 210 comprises a plurality of panels 212, 214, 216, 218, 220 for forming a base or tray BP. The plurality of main panels 212, 214, 216, 218, 220 comprises a base panel 214, a first lower end closure flap 212, a second lower end closure flap 216, a first side flap 218 (or inner side wall) and a second side flap 220 (or inner side wall).

Each of the first and second end closure flaps 212, 216 is coupled to both of the first and second side flaps 218, 220 by a plurality of interconnecting panels. Each plurality of interconnecting panels comprises a bevel panel 226*a*, 226*b*, 228*a*, 228*b*, a side securing panel 222*a*, 222*b*, 224*a*, 224*b* and a web panel 230*a*, 230*b*, 232*a*, 232*b*.

The second blank 310 comprises a plurality of main panels 312, 314, 316 for forming a top part or cover TP. The plurality of main panels 312, 314, 316 comprises a first side panel 312 (or outer side wall), a top panel 314, a second side panel 316 (or outer side wall). The plurality of panels 312, 314, 316 may be arranged in a linear series hinged one to the next by corresponding fold lines 313, 315.

The second blank 310 comprises an end closure structure for partially closing each end of the article carrier 290.

A first end closure structure comprises a first top end closure panel 320*a* hingedly connected to the top panel 314 by a hinged connection in the form of a fold line 319*a*. The first end closure structure comprises a first anchor panel 318*a* hingedly connected to a first edge of the first side panel 312 by a hinged connection in the form of a fold line 317*a*. The first top end closure panel 320*a* is coupled to the first anchor panel 318*a* by a first gusset panel 324*a*. The first gusset panel 324*a* is hingedly connected to the first top end closure panel 320*a* by a hinged connection in the form of a fold line 325*a*. The first gusset panel 324*a* is hingedly connected to the first anchor panel 318*a* by a hinged connection in the form of a fold line 323*a*.

The first end closure structure comprises a second anchor panel 322*a* hingedly connected to a first edge of the second side panel 316 by a hinged connection in the form of a fold line 321*a*. The first top end closure panel 320*a* is coupled to the second anchor panel 322*a* by a second gusset panel 326*a*. The second gusset panel 326*a* is hingedly connected to the first top end closure panel 320*a* by a hinged connection in the form of a fold line 327*a*. The second gusset panel 326*a* is hingedly connected to the second anchor panel 322*a* by a hinged connection in the form of a fold line 329*a*.

A second end closure structure comprises a second top end closure panel 320*b* hingedly connected to the top panel 314 by a hinged connection in the form of a fold line 319*b*. The second end closure structure comprises a third anchor panel 318*b* hingedly connected to a second edge of the first side panel 312 by a hinged connection in the form of a fold line 317*b*. The second top end closure panel 320*b* is coupled to the third anchor panel 318*b* by a third gusset panel 324*b*. The third gusset panel 324*b* is hingedly connected to the second top end closure panel 320*b* by a hinged connection in the form of a fold line 325*b*. The third gusset panel 324*b* is hingedly connected to the third anchor panel 318*b* by a hinged connection in the form of a fold line 323*b*.

The second end closure structure comprises a fourth anchor panel 322*b* hingedly connected to a second edge of the second side panel 316 by a hinged connection in the form of a fold line 321*b*. The second top end closure panel 320*b* is coupled to the fourth anchor panel 322*b* by a second gusset panel 326*b*. The fourth gusset panel 326*b* is hingedly connected to the second top end closure panel 320*b* by a hinged connection in the form of a fold line 327*b*. The fourth gusset panel 326*b* is hingedly connected to the fourth anchor panel 322*b* by a hinged connection in the form of a fold line 329*b*.

The second blank 310 comprises a carrying handle structure HS. The carrying handle structure HS comprises a handle strap 332/332*a*/332*b* hingedly connected to a side edge of the plurality of main panels 312, 314, 316 and a handle opening defined in the top panel 314, optionally the handle opening is defined by a handle panel or feature H struck, at least, from the top panel 314 and defined by a cutline or severable line 365. The handle panel H may comprise a grip panel 360, which is optionally rectangular or oblong in shape. The handle panel H may comprise a cushioning flap 362, 364 hinged to opposing side edges of the grip panel 360 by a hinged connection in the form of fold lines 361, 363 respectively.

The handle strap 332/332*a*/332*b* comprises a central portion 332; a first end of the central portion 332 is hinged to, or integral with a first connecting panel 328 and a second end of the central portion 332 is hinged to, or integral with a second connecting panel 330.

The first connecting panel 328 is hinged to a first side edge of the first side panel 312 by a hinged connection in the form of a fold line 331. The second connecting panel 330 is hinged to a first side edge of the second side panel 316 by a hinged connection in the form of a fold line 333.

The central portion 332 may be hinged to a first end portion 332*a* by a hinged connection in the form of a fold line or pair of fold lines 335*a*. The first end portion 332*a* is formed from, or struck from, the first connecting panel 328. The first end portion 332*a* is defined in part by a pair of cut lines or severable lines 339*a*, 339*b* defined in the first connecting panel 328.

The central portion 332 may be hinged to a second end portion 332*b* by a hinged connection in the form of a fold line or pair of fold lines 335*b*. The second end portion 332*b* is formed from, or struck from, the second connecting panel 330. The second end portion 332*b* is defined in part by a pair of cut lines or severable lines 341*a*, 341*b* defined in the second connecting panel 330.

The cut lines 339*a*, 339*b*, 341*a*, 341*b* may terminate in a 'J' or 'C" shaped cutline.

Optionally, the handle structure HS comprises a reinforcing panel 334, the reinforcing panel 334 is hingedly connected to the central portion 332 by a hinged connection in the form of a fold line 337.

In the embodiment illustrated in FIG. 8 the first anchor panel 318*a* is disposed adjacent to the first connecting panel 328. The first anchor panel 318*a* is separated from the first connecting panel 328, at least in part, by a cut line or severable line. The cut line may be substantially 'S' shaped. In the embodiment illustrated in FIG. 1 the first anchor panel 118*a* is spaced apart from the first connecting panel 128. The first anchor panel 118*a* is separated from the first connecting panel 128 by an aperture, slot or recess.

The first anchor panel 318*a* comprises an upper portion, a lower portion and an intermediate portion. The upper and lower portions are each wider than the intermediate portion. The lower portion is wider than the upper portion.

Cutline 339*b* is shorter than cutline 339*a*. Cutline 339*b* terminates at a cutaway in the form of an aperture, slot or opening.

The first connecting panel 328 is asymmetrically arranged about the end portion 332*a* of the handle strap 332/332*a*/332*b*. A portion of the first connecting panel 328 disposed adjacent to the cutline 339*a* extends further towards the fold lines 335*a* than a portion of the first connecting panel 328 disposed adjacent to the cutline 339*b*.

The second anchor panel 318*b* is disposed adjacent to the second connecting panel 330. The second anchor panel 318*b* is separated from the second connecting panel 330, at least in part, by a cut line or severable line. The cut line may be substantially 'S' shaped.

The second anchor panel 318*b* comprises an upper portion, a lower portion and an intermediate portion. The upper and lower portion are each wider than the intermediate portion. The lower portion is wider than the upper portion.

Cutline 341*b* is shorter than cutline 341*a*. Cutline 341*b* terminates at a cutaway in the form of an aperture, slot or opening.

The second connecting panel 330 is asymmetrically arranged about the end portion 332*b* of the handle strap 332/332*a*/332*b*. A portion of the second connecting panel 330 disposed adjacent to the cutline 341*a* extends further towards the fold lines 335*b* than a portion of the second connecting panel 330 disposed adjacent to the cutline 341*b*.

The cut lines 339*b*, 341*b* are arranged collinearly (with the exception of the 'J' or 'C' shaped terminations) with an edge of the central portion 132 of the handle strap 332.

The cutline 339*a* is divergently arranged with respect to the cutline 339*b* such that the end portion 332*a* of the handle strap 332/332*a*/332*b* is tapered in shape. The cutline 341*a* is divergently arranged with respect to the cutline 341*b* such that the end portion 332*b* of the handle strap 332/332*a*/332*b* is tapered in shape.

The first and second blanks 210, 310 are assembled to form an article carrier 290, as shown in FIGS. 9, 10A and 10B in substantially the same manner described above in relation to the embodiment of FIGS. 1 and 2. The article carrier 290 comprises a tubular structure partially open at both ends and having a tubular axis A.

The carrying handle is shown in FIG. 10A in a deployed condition. The handle panel H has been detached from the top panel 3144 and displaced upwardly. The central portion 332, and the reinforcing panel 334 have been drawn or pulled, at least partially, through an opening in the top panel 314 created by displacement of the handle panel H. In order to allow this the end portions 332*a*, 332*b* of the handle strap 332/332*a*/332*b* are displaced inwardly of the carton 290 moving into a void between two adjacently disposed article B.

FIG. 10B illustrates an internal view of an upper portion of the article carrier 290, the articles B have been omitted for illustrative purposes. The fourth anchor panel 322*b* is disposed in overlapping relationship with the second connecting panel 330. A portion of the cutline 341*a* and a portion of the edge of the second connecting panel 330 are each shown in phantom-dot/dash-lines to illustrate their position relative to the fourth anchor panel 322*b*.

A portion of the second connecting panel 330 is disposed between the second side panel 316 and the fourth anchor panel 322*b*.

A part of the end portion 332*b* of the handle strap 332/332*a*/332*b* is disposed between the second side panel 316 and the fourth anchor panel 322*b*.

One benefit of the overlap between the fourth anchor panel 322*b* and the second connecting panel 330 and/or between the fourth anchor panel 322*b* and the end portion 332*b* of the handle strap 332/332*a*/332*b* is that shocks or impulse forces may be absorbed. The overlap provides a shock absorbing device increasing the carrier's strength or load bearing capacity of the handle structure HS.

Referring now to FIGS. 11 and 12 there is shown another embodiment of the present disclosure. In the third illustrated embodiment, like numerals have, where possible, been used to denote like parts, albeit with the addition of the prefixes "400" and "500" to indicate that these features belong to the third embodiment. The third embodiment shares many common features with the embodiments of FIGS. 1 to 10B, therefore only the differences from the embodiments illustrated in FIGS. 1 to 10B will be described in any greater detail.

FIG. 11 shows a first blank 410 for forming an article carrier (not shown) according to a third embodiment. The blank 410 comprises a plurality of panels 412,414,416,418, 420 for forming a base or tray BP. The plurality of main panels 412, 414, 416, 418, 420 comprises a base panel 414, a first lower end closure flap 412, a second lower end closure flap 416, a first side flap 418 (or inner side wall) and a second side flap 420 (or inner side wall).

Each of the first and second end closure flaps 412, 416 is coupled to both of the first and second side flaps 418, 420 by a plurality of interconnecting panels. Each plurality of interconnecting panels comprises a bevel panel 426*a*, 426*b*, 428*a*, 428*b*, a side securing panel 422*a*, 422*b*, 424*a*, 424*b* and a web panel 430*a*, 430*b*, 432*a*, 432*b*.

The second blank 510 comprises a plurality of main panels 512, 514, 516 for forming a top part or cover TP. The plurality of main panels 512, 514, 516 comprises a first side panel 512 (or outer side wall), a top panel 514, a second side panel 516 (or outer side wall). The plurality of panels 512, 514, 516 may be arranged in a linear series hinged one to the next by corresponding fold lines 513, 515.

The second blank 510 comprises an end closure structure for partially closing each end of the article carrier.

A first end closure structure comprises a first top end closure panel 520*a* hingedly connected to the top panel 514 by a hinged connection in the form of a fold line 519*a*. The first end closure structure comprises a first anchor panel 518*a* hingedly connected to a first edge of the first side panel 512 by a hinged connection in the form of a fold line 517*a*. The first top end closure panel 520*a* is coupled to the first anchor panel 518*a* by a first gusset panel 524*a*. The first gusset panel 524*a* is hingedly connected to the first top end closure panel 520*a* by a hinged connection in the form of a fold line 525*a*. The first gusset panel 524*a* is hingedly connected to the first anchor panel 518*a* by a hinged connection in the form of a fold line 523*a*.

The first end closure structure comprises a second anchor panel 522*a* hingedly connected to a first edge of the second side panel 516 by a hinged connection in the form of a fold line 521*a*. The first top end closure panel 520*a* is coupled to the second anchor panel 522*a* by a second gusset panel 526*a*. The second gusset panel 526*a* is hingedly connected to the first top end closure panel 520*a* by a hinged connection in the form of a fold line 527*a*. The second gusset panel 526*a* is hingedly connected to the second anchor panel 522*a* by a hinged connection in the form of a fold line 529*a*.

A second end closure structure comprises a second top end closure panel 520*b* hingedly connected to the top panel 514 by a hinged connection in the form of a fold line 519*b*. The second end closure structure comprises a third anchor panel 518*b* hingedly connected to a second edge of the first side panel 512 by a hinged connection in the form of a fold line 517*b*. The second top end closure panel 520*b* is coupled to the third anchor panel 518*b* by a third gusset panel 524*b*. The third gusset panel 524*b* is hingedly connected to the second top end closure panel 520*b* by a hinged connection in the form of a fold line 525*b*. The third gusset panel 524*b* is hingedly connected to the third anchor panel 518*b* by a hinged connection in the form of a fold line 523*b*.

The second end closure structure comprises a fourth anchor panel 522*b* hingedly connected to a second edge of the second side panel 516 by a hinged connection in the form of a fold line 521*b*. The second top end closure panel 520*b* is coupled to the fourth anchor panel 522*b* by a fourth gusset panel 526*b*. The fourth gusset panel 526*b* is hingedly connected to the second top end closure panel 520*b* by a hinged connection in the form of a fold line 527*b*. The fourth gusset panel 526*b* is hingedly connected to the fourth anchor panel 522*b* by a hinged connection in the form of a fold line 529*b*.

The second blank 510 comprises a carrying handle structure HS. The carrying handle structure HS comprises a handle strap 582/582*a*/582*b* hingedly connected to a side edge of the plurality of main panels 512, 514, 516 and a handle opening defined in the top panel 514, optionally the handle opening is defined by a handle panel or feature H struck from the top panel 514 and defined by a cutline or severable line 575. The handle panel H may comprise a grip panel 570, which is optionally rectangular or oblong in shape. The handle panel H may comprise a cushioning flap 572, 574 hinged to the grip panel 570 by a hinged connection in the form of fold lines 571, 573 respectively. The fold lines 571, 573 are each offset, inset with respect to opposing side edges of the grip panel 570, such that a portion of each cushioning flap 572, 574 is struck from, or defined in, the grip panel 570.

The handle strap 582/582*a*/582*b* comprises a central portion 582; a first end of the central portion 582 is hinged to, or integral with a first connecting panel 528 and a second end of the central portion 582 is hinged to, or integral with a second connecting panel 530.

The fold lines 571, 573 are spaced apart from each other and are disposed substantially parallel to each other. The fold lines 571, 573 are spaced apart by a distance equal to or greater than the intermediate part of the central portion 582.

The first connecting panel 528 is hinged to a first side edge of the first side panel 512 by a hinged connection in the form of a fold line 531. The second connecting panel 530 is hinged to a first side edge of the second side panel 516 by a hinged connection in the form of a fold line 533.

The central portion 582 comprises an intermediate part comprising a pair of parallel opposed side edges, and a pair of end parts; each end part is wider than the intermediate part and comprises a transition region having divergently arranged opposed side edges.

In this way the central portion 582 is 'bow-tie' shaped or 'bone' shaped.

One of the end parts of the central portion 582 is hinged to a first end portion 582*a* by a hinged connection in the form of a fold line or pair of fold lines 583*a*. The first end portion 582*a* is formed from, or struck from, the first connecting panel 528. The first end portion 582*a* is defined in part by a cut line or severable line defined in the first connecting panel 528 and extending into the central portion 582, the cutline may be 'U' shaped. Each end of the cut line may terminate in a 'J' or 'C" shaped cutline. The cut line defines a first tab 588*b* which is struck at least in part from the first connecting panel 528. A cutaway in the form of an aperture A7 is struck in part from the first connecting panel 528 and in part from the central portion 582 so as to interrupt the pair of fold lines 583*a*.

In some embodiments the first tab 588*b* may extend into the central portion 582 so as to be struck in part therefrom. The first tab 588*b* may comprise a fold line disposed substantially collinearly with the fold line 513. In this way a portion of the first tab 588*b* may fold when the first side panel 512 is folded with respect to the top panel 514.

The other of the end parts of the central portion 582 is hinged to a second end portion 582*b* by a hinged connection in the form of a fold line or pair of fold lines 583*b*. The second end portion 582*b* is formed from, or struck from, the second connecting panel 530. The second end portion 582*b* is defined in part by a cut line or severable line defined in the second connecting panel 530 and extending into the central portion 582, the cutline may be shaped. Each end of the cut line may terminate in a 'J' or 'C" shaped cutline. The cut line defines a second tab 588*d* which is struck in part from the second connecting panel 530 and in part from the central portion 582. A cutaway in the form of an aperture A8 is struck in part from the second connecting panel 530 and in part from the central portion 582 so as to interrupt the pair of fold lines 583*b*.

In some embodiments the second tab 588*d* may extend into the central portion 582 so as to be struck in part therefrom. The second tab 588*d* may comprise a fold line disposed substantially collinearly with the fold line 515. In this way a portion of the second tab 588*d* may fold when the second side panel 516 is folded with respect to the top panel 514.

In this way the handle strap 582/582*a*/582*b* comprises forked ends. Each end comprising a prong disposed on opposing sides of each of the first and second tabs 588*b*, 588*d*. The forked ends commence in the central portion 582 and terminate in the first and second connecting panels 528, 530.

Optionally, the handle structure HS comprises a reinforcing member RM, the reinforcing member RM comprises a first end reinforcing panel 584, central reinforcing panel 580 and a second end reinforcing panel 586. The first end reinforcing panel 584 is hingedly connected to the central reinforcing panel 580 by a hinged connection in the form of a fold line or pair of fold lines 581*a*. The second end reinforcing panel 586 is hingedly connected to the central reinforcing panel 580 by a hinged connection in the form of a fold line or pair of fold lines 581*b*.

The first end reinforcing panel 584 is hingedly connected to the first connecting panel 528 by a hinged connection in the form of a fold line 585.

The second end reinforcing panel 586 is hingedly connected to the second connecting panel 530 by a hinged connection in the form of a fold line 587.

The central reinforcing panel 580 is hingedly connected to the central portion 582 by a hinged connection in the form of a fold line 589. Fold line 589 is interrupted by a cutaway or aperture A11. The aperture A11 may be hexagonal in shape. In this way end parts of the central reinforcing panel 580 are hingedly connected to adjacently disposed end parts of the central portion 582.

The first end reinforcing panel 584 comprises a third tab 588*a*, the third tab 588*a* is defined at least in part by a cutline defined in the first end reinforcing panel 584 and extending into the central reinforcing panel 580. Each end of the cut line may terminate in a ‘J’ or ‘C” shaped cutline. A cutaway in the form of an aperture A9 is struck in part from the first end reinforcing panel 584 and in part from the central reinforcing panel 580 so as to interrupt the pair of fold lines 581*a*.

The second end reinforcing panel 586 comprises a fourth tab 588*c*, the fourth tab 588*c* is defined at least in part by a cutline defined in the second end reinforcing panel 586 and extending into the central reinforcing panel 580. Each end of the cut line may terminate in a ‘J’ or ‘C” shaped cutline. A cutaway in the form of an aperture A10 is struck in part from the second end reinforcing panel 586 and in part from the central reinforcing panel 580 so as to interrupt the pair of fold lines 581*b*.

In this way the reinforcing strap comprises forked ends similarly arranged to those of the handle strap HS. Each end comprising a prong disposed on opposing sides of each of the third and fourth tabs 588*a*, 588*c*. The forked ends commence in the central reinforcing panel 580 and terminate in the first and second end reinforcing panels 584, 586.

The first, second, third and fourth tabs 588*b*, 588*d*, 588*a*, 588*c* are dimensioned and arranged to define openings in the end portions 582*a*, 582*b* of the handle strap 582/582*a*/582*b* and in the end portions 580*a*, 580*b* of the reinforcing member RM which are sufficiently large so as to allow a portion of an adjacently disposed article to pass through. In this way the prongs of the forked ends of the handle strap and the reinforcing strap can be displaced into voids on opposing sides of an article, a first void provided on a first side between a first article (centremost) and a second article, a second void provided on a second side between the first article (centremost) and a third article.

Referring now to FIGS. 13 and 14 there is shown further embodiments of the present disclosure. In the fourth and fifth illustrated embodiments, like numerals have, where possible, been used to denote like parts, albeit with the addition of the prefixes “600” and “700” to indicate that these features belong to the fourth and fifth embodiments respectively. The fourth and fifth embodiments share many common features with the embodiments of FIGS. 1 to 12, therefore only the differences from the embodiments illustrated in FIGS. 1 to 12 will be described in any greater detail.

In the fourth illustrated embodiment, shown in FIG. 13, a single, unitary blank 610 is configured to form an article carrier (not shown) of the fully-enclosed type.

The blank 610 comprises a plurality of panels 658, 612, 614, 616, 652 for forming a tubular structure. The plurality of main panels 658, 612, 614, 616, 652 comprises a securing panel 658, a first side panel 612, a top panel 614, a second side panel 616, and a base panel 652*a*. The plurality of main panels 658, 612, 614, 616, 652 may be hingedly connected one to the next in a linear series by hinged connections in the form of fold lines 657, 613, 615, 617, 655.

Each end of the tubular structure is closed by an end closure structure. A first end closure structure comprises a first plurality of end closure flaps. A first lower side end closure flap 618*c* is hinged to a first side edge of the first side panel 612 by a hinged connection in the form of fold line 617*c*. A first upper side end closure flap 618*a* is hinged to a first side edge of the first side panel 612 by a hinged connection in the form of fold line 617*a*. The first upper side end closure flap 618*a* and the first lower side end closure flap 618*c* can be considered to form a first side end closure flap 618*a*/618*c*. A first top end closure flap 620*a* is hinged to a first side edge of the top panel 614 by a hinged connection in the form of fold line 619*a*. A second upper side end closure flap 622*a* is hinged to a first side edge of the second side panel 616 by a hinged connection in the form of fold line 621*a*. A second lower side end closure flap 622*c* is hinged to a first side edge of the second side panel 616 by a hinged connection in the form of fold line 621*c*. The second upper side end closure flap 622*a* and the second lower side end closure flap 622*c* can be considered to form a second side end closure flap 622*a*/622*c*. A first base end closure flap 654*a* is hinged to a first side edge of the base panel 652 by a hinged connection in the form of fold line 653*a*.

A second end closure structure comprises a second plurality of end closure flaps. A third side end closure flap 618*c* is hinged to a second side edge of the first side panel 612 by a hinged connection in the form of fold line 617*b*. A second top end closure flap 620*b* is hinged to a second side edge of the top panel 614 by a hinged connection in the form of fold line 619*b*. A fourth side end closure flap 622*b* is hinged to a second side edge of the second side panel 616 by a hinged connection in the form of fold line 621*a*. A second base end closure flap 654*b* is hinged to a second side edge of the base panel 652 by a hinged connection in the form of fold line 653*b*.

The blank 610 comprises a carrying handle structure. The carrying handle structure comprises a handle strap 632/

632*a*/632*b* hingedly connected to a side edge of the plurality of main panels 658, 612, 614, 616, 652 and a handle opening defined in the top panel 614. Optionally, the handle opening is defined by a handle panel or feature H struck from the top panel 614 and defined by a cutline or severable line 651. The handle panel H may comprise a grip panel 140, which is optionally bow-tie shaped. The handle panel H may comprise a cushioning flap 642, 644 hinged to opposing side edges of the grip panel 640 by a hinged connection in the form of fold lines 643*a*, 643*b* respectively. Each cushioning flap 642, 644 may comprise at least one fold line for facilitating folding of the cushioning flaps 642, 644. Each cushioning flap 642, 644 may comprise a cutline or severance line for facilitating division of the cushioning flaps 642, 644 into two parts each hinged to their respective side edge of the grip panel 640.

The handle strap 632/632*a*/632*b* comprises a central portion 632; a first end of the central portion 632 is hinged to, or integral with a first connecting panel 628 and a second end of the central portion 632 is hinged to, or integral with a second connecting panel 630.

The first connecting panel 628 is hinged to a first side edge of the first side panel 612 by a hinged connection in the form of a fold line 631. The second connecting panel 630 is hinged to a first side edge of the second side panel 616 by a hinged connection in the form of a fold line 633.

The portion of the first connecting panel 628 hinged to the first side panel 612 is disposed between the first lower side end closure flap 618*c* and the first upper side end closure flap 618*a*. The first connecting panel 628 can be considered to interrupt the first side end closure flap 618*a*/618*c*.

The fold line 631 is disposed between the fold line 617*c* and the fold line 617*a*. The fold line 631 may be contiguous the fold line 617*c* and with the fold line 617*a*. The fold line 631 may be collinear the fold line 617*c* and with the fold line 617*a*.

The portion of the second connecting panel 630 hinged to the second side panel 616 is disposed between the second lower side end closure flap 622*c* and the second upper side end closure flap 622*a*. The second connecting panel 630 can be considered to interrupt the second side end closure flap 622*a*/622*c*.

The fold line 633 is disposed between the fold line 621*c* and the fold line 621*a*. The fold line 633 may be contiguous the fold line 621*c* and with the fold line 621*a*. The fold line 633 may be collinear the fold line 621*c* and with the fold line 621*a*.

The central portion 632 of the handle strap 632/632*a*/632*b* may be hinged to a first end portion 632*a* by a hinged connection in the form of a fold line or pair of fold lines 635*a*. The first end portion 632*a* is formed from, or struck from, the first connecting panel 628. The first end portion 132*a* is defined in part by a pair of cut lines or severable lines 639*a*, 639*b* defined in the first connecting panel 628. The pair of cut lines 639*a*, 639*b* may be divergently arranged with respect to each other. The pair of cut lines 639*a*, 639*b* converge towards the central portion 632.

The central portion 632 may be hinged to a second end portion 632*b* by a hinged connection in the form of a fold line or pair of fold lines 635*b*. The second end portion 632*b* is formed from, or struck from, the second connecting panel 630. The second end portion 632*b* is defined in part by a pair of cut lines or severable lines 641*a*, 641*b* defined in the second connecting panel 630. The pair of cut lines 641*a*, 641*b* may be divergently arranged with respect to each other. The pair of cut lines 641*a*, 641*b* converge towards the central portion 632.

The cut lines 639*a*, 639*b*, 641*a*, 641*b* may terminate in a ‘J’ or ‘C” shaped cutline.

Optionally, the handle structure HS comprises a reinforcing panel 634, the reinforcing panel 634 is hingedly connected to the central portion 632 by a hinged connection in the form of a fold line 637.

In the fifth illustrated embodiment, shown in FIG. 14, a single, unitary blank 710 is configured to form an article carrier (not shown) of the wrap-around type.

This embodiment employs the handle structure HS as illustrated in FIG. 12 and described above in relation to the third embodiment. The embodiments of FIGS. 12 and 14 both accommodate rows of three adjacently disposed articles B. This arrangement comprises an article in a central or middle of each row, this central article being disposed equidistant from each of the ends of the tubular structure formed by main panels 706, 712, 714, 716, 708. The handle structure HS is configured to accommodate this central article. End portions of the handle structure HS being displaceable into voids disposed one opposed sides of the central articles. In alternative embodiments (not shown) the blank 710 may employ the handle structure HS as illustrated in FIG. 2 or FIG. 8 and described above in relation to the first or second embodiments.

The blank 710 comprises a plurality of panels 706, 712, 714, 716, 708 for forming the tubular structure. The plurality of panels 706, 712, 714, 716, 708 includes a first base panel 706, a first side panel 712, a top panel 714, a second side panel 716, and a second base panel 708. The plurality of main panels 706, 712, 714, 716, 708 are hingedly connected one to the next in a linear series by hinged connections in the form of fold lines 707, 713, 715, 717, 709.

The blank 710 comprises a first base panel 706 hinged to the first side panel 712 by a hinged connection in the form of a fold line 707. The blank 710 comprises a second base panel 708 hinged to the second side panel 716 by a hinged connection in the form of a fold line 709.

The first and second base panels 706, 708 are engageable with one another in an overlapping relationship to form a composite base wall 706/708 of the carrier. The blank 710 may comprise a complementary locking mechanism for securing the first base panel 706 to the second base panel 708. The first base panel 706 may comprise at least one first part M of the complementary locking mechanism. The second base panel 708 may comprise at least one second part F of the complementary locking mechanism. In the illustrated embodiment, the first base panel 706 comprises six male tabs M struck therefrom so as to be defined within the first base panel 706. Each of the male tabs M is hingedly connected to the first base panel 706 by a hinged connection in the form of a fold line.

The second part F of the complementary locking mechanism forms a receiver. The receiver comprises an opening or slot for receiving the male tab M.

The second base panel 708 comprises six optional female tabs each defining an opening or slot in the second base panel 708; the female tabs forming at least part of the receiver.

The openings in the second base panel 708 are configured to receive respective ones of the male tabs M.

The female tabs are arranged to be displaced out of the second base panel 708 to form said openings and to bear against the respective male tab M when received therein. In some embodiments the complementary locking mechanism M/F may be omitted, the first and second base panels 706, 708 may be secured to each other by other means, such as but not limited to adhesive or staples.

Optionally, the first and second base panels 706, 708 may comprise at least one first aperture A5. In the illustrated embodiment, each of the first and second base panels 706, 708 comprises three first apertures A5. The first apertures A5 may be employed to facilitate construction of the carton. A packaging machine component or tool may engage with the first apertures A5 to facilitate alignment of the first and second base panels 706, 708 with respect to each other or to align the first part M of the complementary locking mechanism with the second part F of the complementary locking mechanism. The complementary locking mechanism illustrated and described is entirely optional.

Optionally, the first and second side panels 712, 716 may comprise at least one article receiving aperture A6. Each article receiving aperture A6 is arranged to receive a heel or lower portion of an article. In the illustrated embodiment the first and second side panels 712, 716 each comprise three article receiving apertures A6, each of the articles in the article carrier engages with a respective one of the article receiving apertures A6. In other embodiments only the endmost articles in each row of articles may be engaged by an article receiving apertures A6.

Each article receiving aperture A6 is struck from the respective one of the first and second side panels 712, 716 adjacent to their respective hinged connection to the first or second base panel 706, 708. The article receiving aperture A6 may extend into the respective one of first and second base panels 706, 708 so as to interrupt the fold line 707, 709 respectively.

Referring now to FIGS. 15 to 20 there is shown a further alternative embodiment of the present disclosure. In the sixth illustrated embodiment, like numerals have, where possible, been used to denote like parts, albeit with the addition of the prefix "800" to indicate that these features belong to the sixth embodiment. The sixth embodiment shares many common features with the embodiment of FIGS. 1 to 14, therefore only the differences from the embodiment illustrated in FIGS. 1 to 14 will be described in any greater detail.

FIG. 15 illustrates a second blank 810 comprises a plurality of main panels 812, 814, 816 for forming a top part or cover TP. The plurality of main panels 812, 814, 816 comprises a first side panel 812 (or outer side wall), a top panel 814, a second side panel 816 (or outer side wall). The plurality of panels 812, 814, 816 may be arranged in a linear series hinged one to the next by corresponding fold lines 813, 815.

The second blank 810 may be employed with a suitable first blank to form a carrier or carton (not shown); the first blank forming a tray to which the second blank 810—which forms a top part or cover—is secured. For example, but not limited to, the second blank 810 may be employed with the blank 10, 210, 410 of any one of FIG. 1, 7 or 11. In still other embodiments it will be appreciated that the second blank 810 may be adapted similarly to the blanks of FIGS. 13 and 14 so as to include a base wall structure such that the second blank 810 forms a tubular structure for enclosing at least one primary product container.

The second blank 810 comprises an end closure structure for partially closing each end of the article carrier.

A first end closure structure comprises a first pair of top end closure panels 820*a*, 820*b* each hingedly connected to the top panel 814 by a hinged connection in the form of fold lines 819*a*, 819*b*. The first end closure structure comprises a first anchor panel 818*a* hingedly connected to a first edge of the first side panel 812 by a hinged connection in the form of a fold line 817*a*.

The first anchor panel 818*a* is coupled to one of the first pair of top end closure panels 820*a*, 820*b* by a first gusset panel 824*a*. The first gusset panel 824*a* is hingedly connected to said top end closure panel 820*a* by a hinged connection in the form of a fold line 825*a*. The first gusset panel 824*a* is hingedly connected to the first anchor panel 818*a* by a hinged connection in the form of a fold line 823*a*.

A first relief aperture A1 is struck, at least in part, from the first anchor panel 818*a*, the first relief aperture A1 interrupts the fold line 823*a* and the fold line 817*a*. A first edge portion of the first relief aperture A1 may be collinear with the fold line 823*a* and a second edge portion of the first relief aperture A1 may be collinear with the fold line 817*a*. The first and second edge portions may converge to define a vertex or corner, said corner may be located at the point fold lines 817*a*, 819*a*, 825*a*, 813 and 823*a* would intersect if the first relief aperture A1 were omitted.

The first end closure structure comprises a second anchor panel 822*a* hingedly connected to a first edge of the second side panel 816 by a hinged connection in the form of a fold line 821*a*.

The second anchor panel 822*a* is coupled to the other one of the first pair of top end closure panels 820*a*, 820*b* by a second gusset panel 826*a*. The second gusset panel 826*a* is hingedly connected to the said other top end closure panel 820*b* by a hinged connection in the form of a fold line 827*a*. The second gusset panel 826*a* is hingedly connected to the second anchor panel 822*a* by a hinged connection in the form of a fold line 829*a*.

A second relief aperture A2 is struck, at least in part, from the second anchor panel 822*a*, the second relief aperture A2 interrupts the fold line 829*a* and the fold line 821*a*. A first edge portion of the second relief aperture A2 may be collinear with the fold line 829*a* and a second edge portion of the second relief aperture A2 may be collinear with the fold line 821*a*. The first and second edge portions may converge to define a vertex or corner, said corner may be located at the point fold lines 821*a*, 819*b*, 827*a*, 815 and 829*a* would intersect if the second relief aperture A2 were omitted.

A second end closure structure comprises a second pair of top end closure panels 820*c*, 820*d* each hingedly connected to the top panel 814 by a hinged connection in the form of fold line 819*c*, 819*d*. The second end closure structure comprises a third anchor panel 818*b* hingedly connected to a second edge of the first side panel 812 by a hinged connection in the form of a fold line 817*b*.

The third anchor panel 818*b* is coupled to one of the second pair of top end closure panels 820*c*, 820*d* by a third gusset panel 824*b*. The third gusset panel 824*b* is hingedly connected to said one top end closure panel 820*c* by a hinged connection in the form of a fold line 825*b*. The third gusset panel 824*b* is hingedly connected to the third anchor panel 818*b* by a hinged connection in the form of a fold line 823*b*.

A third relief aperture A3 is struck, at least in part, from the third anchor panel 818*b*, the third relief aperture A3 interrupts the fold line 823*b* and the fold line 817*b*. A first edge portion of the third relief aperture A3 may be collinear with the fold line 823*b* and a second edge portion of the third relief aperture A3 may be collinear with the fold line 817*b*. The first and second edge portions may converge to define a vertex or corner, said corner may be located at the point fold lines 817*b*, 819*c*, 825*b*, 813 and 823*b* would intersect if the third relief aperture A3 were omitted.

The second end closure structure comprises a fourth anchor panel 822*b* hingedly connected to a second edge of the second side panel 816 by a hinged connection in the form of a fold line 821*b*.

The fourth anchor panel 822*b* is coupled to the other one of the second pair of top end closure panels 820*c*, 820*d* by a fourth gusset panel 826*b*. The fourth gusset panel 826*b* is hingedly connected to said other top end closure panel 820*d* by a hinged connection in the form of a fold line 827*b*. The fourth gusset panel 826*b* is hingedly connected to the fourth anchor panel 822*b* by a hinged connection in the form of a fold line 829*b*.

A fourth relief aperture A4 is struck, at least in part, from the fourth anchor panel 822*b*, the fourth relief aperture A4 interrupts the fold line 829*b* and the fold line 821*b*. A first edge portion of the fourth relief aperture A4 may be collinear with the fold line 829*b* and a second edge portion of the fourth relief aperture A4 may be collinear with the fold line 821*b*. The first and second edge portions may converge to define a vertex or corner, said corner may be located at the point fold lines 821*b*, 819*d*, 825*b*, 815 and 829*b* would intersect if the fourth relief aperture A4 were omitted.

Figure 20:
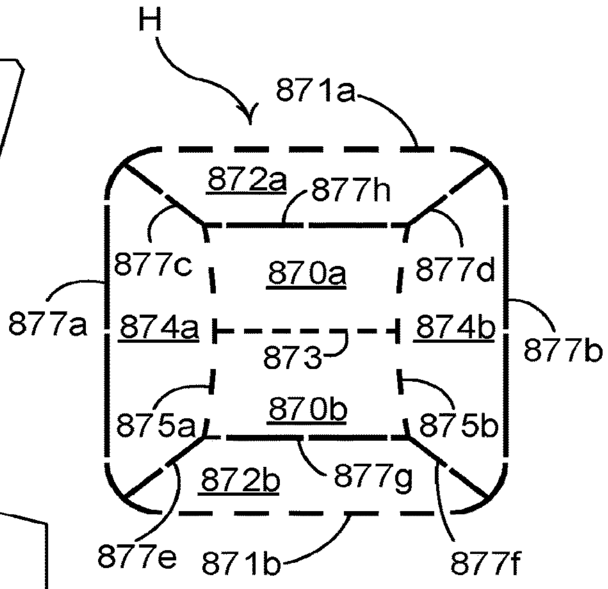
FIG. 20 is an enlarged view of a handle panel in FIG. 15.

The second blank 810 comprises a carrying handle structure HS. The carrying handle structure HS comprises a handle strap 882/882*a*/882*b* hingedly connected to a side edge of the plurality of main panels 812, 814, 816 and a handle opening defined in the top panel 814, optionally the handle opening is defined by a handle panel or feature H struck from the top panel 814. Referring to FIG. 20, the handle panel H is defined by cut lines or severable lines 877*a*, 877*b*, 877*c*, 877*d*, 877*e*, 877*f*, 877*g*, 877*h*. The handle panel H may comprise a grip panel 870*a*/870*b*, which is optionally quadrilateral, square, rectangular or oblong in shape. The handle panel H may comprise cushioning flaps 874*a*, 874*b* hinged to opposing sides of the grip panel 870*a*/870*b* by a hinged connection in the form of fold lines 875*a*, 875*b* respectively. The fold lines 875*a*, 875*b* may be non-linear, arcuate or curvilinear in shape.

The grip panel 870*a*/870*b* and the cushioning flaps 874*a*, 874*b* are detachably connected to the top panel 814.

The handle opening may be defined in part by handle flaps 872*a*, 872*b*. The handle flaps 872*a*, 872*b* may be hingedly connected to the top panel 814 by fold lines 871*a*, 871*b* respectively. In other embodiments the handle flaps 872*a*, 872*b* may be detachably connected to the top panel 814.

It will be appreciated that the handle panel H shown in FIG. 15 may be employed with the handle structures of the previous embodiments. It will also be appreciated that the handle panel arrangements of the embodiments of FIGS. 1 to 14 may replace the arrangement shown in FIG. 15.

The handle strap 882/882*a*/882*b* comprises a central portion 882; a first end of the central portion 882 is hinged to, or integral with a first connecting panel 828 and a second end of the central portion 882 is hinged to, or integral with a second connecting panel 830.

The fold lines 871*a*, 871*b* are spaced apart from each other. The fold lines 871*a*, 871*b* are spaced apart by a distance equal to or greater than the width, linear dimension in the longitudinal direction of the carrier (the longitudinal direction extending between the first and second end closure structures), of the intermediate part of the central portion 882.

The first connecting panel 828 is hinged to a first side edge of the first side panel 812 by a hinged connection in the form of a fold line 831. The fold line 831 is offset, inset, with respect to the fold lines 819*a*, 819*b* which define hinged connections between the first pair of top end closure panels 820*a*, 820*b* and the top panel 814.

The fold line 831 is offset, inset, with respect to an adjacent portion edge of the first side panel 812.

The second connecting panel 830 is hinged to a first side edge of the second side panel 816 by a hinged connection in the form of a fold line 833. The fold line 833 is offset, inset, with respect to the fold lines 819*a*, 819*b* which define hinged connections between the first pair of top end closure panels 820*a*, 820*b* and the top panel 814.

The fold line 832 is offset, inset, with respect to an adjacent portion edge of the second side panel 816.

The offset arrangement of fold lines 831, 833 with respect to the end edge of the top panel 814 and/or end edge portions of the first and second side panels 812, 816 has the effect of reducing the width, linear dimension, of the blank 810.

The central portion 882 comprises an intermediate part comprising a pair of parallel opposed side edges, and a pair of end parts; each end part is wider than the intermediate part and comprises a transition region having divergently arranged opposed side edges.

In this way the central portion 882 is 'bow-tie' shaped or 'bone' shaped.

One of the end parts of the central portion 882 is hinged to a first end portion 882*a* by a hinged connection in the form of a fold line or pair of fold lines 883*a*. The first end portion 882*a* is formed from, or struck from, the first connecting panel 828. The first end portion 882*a* is defined in part by a cut line or severable line defined in the first connecting panel 828 and extending into the central portion 882, the cutline may be 'U' shaped. Each end of the cut line may terminate in a 'J' or 'C" shaped cutline. The cut line defines a first tab 888*b* which is struck at least in part from the first connecting panel 828. A cutaway in the form of an aperture A7 is struck in part from the first connecting panel 828 and in part from the central portion 882 so as to interrupt the pair of fold lines 883*a*.

The other of the end parts of the central portion 882 is hinged to a second end portion 882*b* by a hinged connection in the form of a fold line or pair of fold lines 883*b*. The second end portion 882*b* is formed from, or struck from, the second connecting panel 830. The second end portion 882*b* is defined in part by a cut line or severable line defined in the second connecting panel 830 and extending into the central portion 882, the cutline may be 'U' shaped. Each end of the cut line may terminate in a 'J' or 'C" shaped cutline. The cut line defines a second tab 888*d* which is struck in part from the second connecting panel 830 and in part from the central portion 882. A cutaway in the form of an aperture A8 is struck in part from the second connecting panel 830 and in part from the central portion 882 so as to interrupt the pair of fold lines 883*b*.

In this way the handle strap 882/882*a*/882*b* comprises forked ends. Each end comprising a prong disposed on opposing sides of each of the first and second tabs 888*b*, 888*d*. The forked ends commence in the central portion 882 and terminate in the first and second connecting panels 828,830.

Optionally, the handle structure HS comprises a handle reinforcing structure including at least one handle reinforcing member RM1, RM2 for strengthening the handle structure HS. A first reinforcing member RM1 comprises a first end reinforcing panel 884 and a first central reinforcing panel 880*c*. The first end reinforcing panel 884 is hingedly connected to the first end reinforcing panel 884 by a hinged connection in the form of a fold line 885. Fold line 885 is oriented substantially perpendicularly to fold line 831 which hinges the first connecting panel 828 to the first side panel 812. The first end reinforcing panel 884 is separated from the first connecting panel 828 by a cutaway in the form of a cut line 891.

A second reinforcing member RM2 comprises a second end reinforcing panel 886 and a second central reinforcing panel 880*d*. The second end reinforcing panel 886 is hingedly connected to the second end reinforcing panel 886 by a hinged connection in the form of a fold line 887. Fold line 887 is oriented substantially perpendicularly to fold line 833 which hinges the second connecting panel 830 to the second side panel 816. The second end reinforcing panel 886 is separated from the second connecting panel 830 by a cutaway in the form of a cut line 889.

The first end reinforcing panel 884 is hingedly connected to the first central reinforcing panel 880*c* by a hinged connection in the form of a fold line or pair of fold lines 881*a*. The second end reinforcing panel 886 is hingedly connected to the second central reinforcing panel 880*d* by a hinged connection in the form of a fold line or pair of fold lines 881*b*.

The first end reinforcing panel 884 comprises a third tab 888*a*, the third tab 888*a* is defined at least in part by a cutline defined in the first end reinforcing panel 884 and extending into the first central reinforcing panel 880*c*. Each end of the cut line may terminate in a 'J' or 'C" shaped cutline. A cutaway in the form of an aperture A9 is struck in part from the first end reinforcing panel 884 and in part from the first central reinforcing panel 880*c* so as to interrupt the pair of fold lines 881*a*.

The second end reinforcing panel 886 comprises a fourth tab 888*c*, the fourth tab 888*c* is defined at least in part by a cutline defined in the second end reinforcing panel 886 and extending into the second central reinforcing panel 880*d*. Each end of the cut line may terminate in a 'J' or 'C" shaped cutline. A cutaway in the form of an aperture A10 is struck in part from the second end reinforcing panel 886 and in part from the second central reinforcing panel 880*d* so as to interrupt the pair of fold lines 881*b*.

In this way the first and second reinforcing members comprises forked elements or end portions 880*a*, 880*b* similarly arranged to those of the handle strap HS. Each element 880*a*, 880*b* comprises a prong disposed on opposing sides of each of the third and fourth tabs 888*a*, 888*c* respectively. The forked elements 880*a*, 880*b* commence in the one of the first and second central reinforcing panels 880*c*, 880*d* and terminate in the respective one of the first and second end reinforcing panels 884, 886.

The first, second, third and fourth tabs 888*b*, 888*d*, 888*a*, 888*c* are dimensioned and arranged to define openings in the end portions 882*a*, 882*b* of the handle strap 882/882*a*/882*b* and in the end portions 880*a*, 880*b* of the reinforcing members RM1, RM2 which are sufficiently large so as to allow a portion of an adjacently disposed article to pass through. In this way the prongs of the forked ends of the handle strap and the reinforcing members RM1, RM2 can be displaced into voids on opposing sides of an article, a first void provided on a first side between a first article (centremost) and a second article, a second void provided on a second side between the first article (centremost) and a third article.

It will be appreciated that the handle reinforcing structure of the embodiment of FIG. 15 may be employed with the handle structures of the embodiments of FIGS. 1 to 14 either as an additional feature or as a replacement of an existing reinforcing feature; such alternative embodiments may comprise at least one handle reinforcing feature or two or more handle reinforcing features.

Turning to the construction of a package (not illustrated), an article carrier can be formed by a series of sequential folding operations. The folding process is not limited to that described below and may be altered according to particular manufacturing requirements. FIGS. 16 to 20 illustrate stages of construction of an intermediate product from the second blank 810.

Glue G or other adhesive treatment is applied to each of the central portion 882, first end portion 882*a*, second end portion 882*b*, first and second tabs 888*b*, 888*d* and portions of the first and second connecting panels 828, 830, as shown in FIG. 16. In other embodiments the glue may be applied to a corresponding regions of an inner surface of the first and second reinforcing members RM1, RM2.

Figure 17:
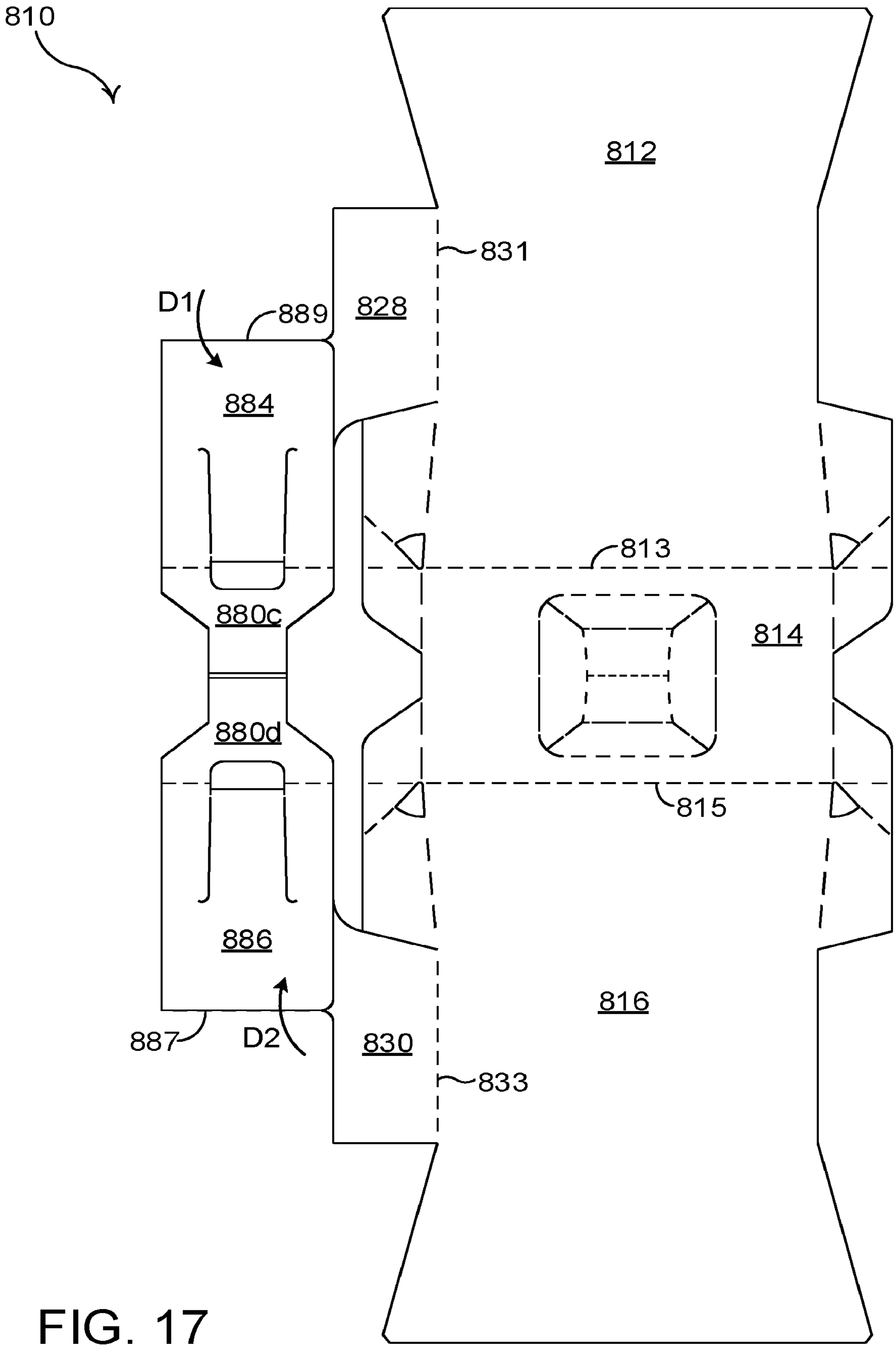

The second blank 810 is folded about fold line 885, as indicated by direction arrow D1 in FIG. 17, such that the first reinforcing member RM1 is brought into face contacting relationship with respect to the first connecting panel 828, first end portion 882*a*, first tab 888*b* and a portion of the central portion 882.

The second blank 810 is folded about fold line 887, as indicated by direction arrow D2 in FIG. 17, such that the second reinforcing member RM2 is brought into face contacting relationship with respect to the second connecting panel 830, second end portion 882*b*, second tab 888*d* and a portion of the central portion 882.

Figure 18:
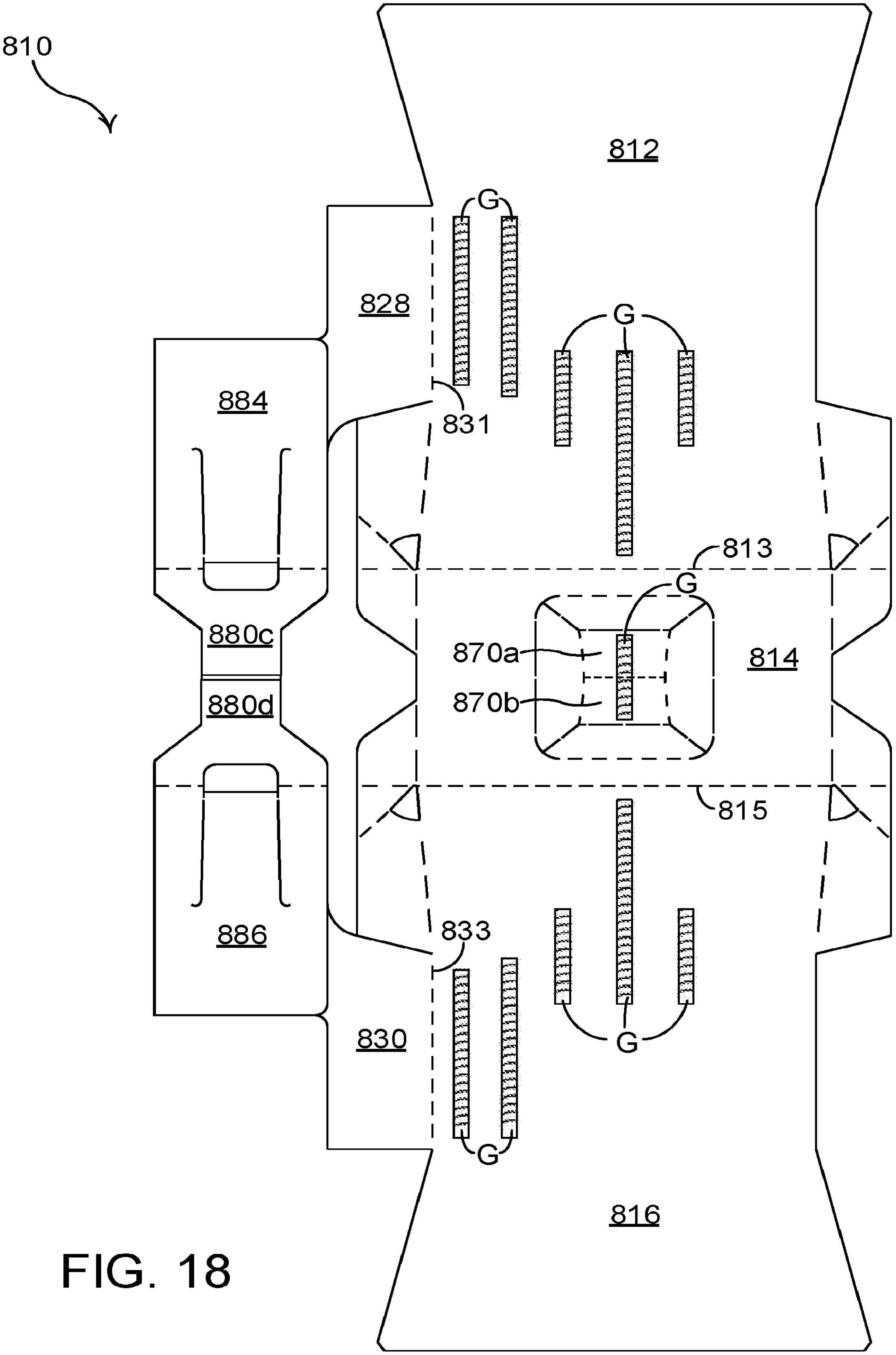

Glue G or other adhesive treatment is applied to each of the first and second side panels 812, 816 and to the grip panel 870*a*/870*b*, as shown in FIG. 18. In other embodiments the glue may be applied to regions of the first and second reinforcing members RM1, RM1 and the first and second connecting panels 828, 830.

Figure 19:
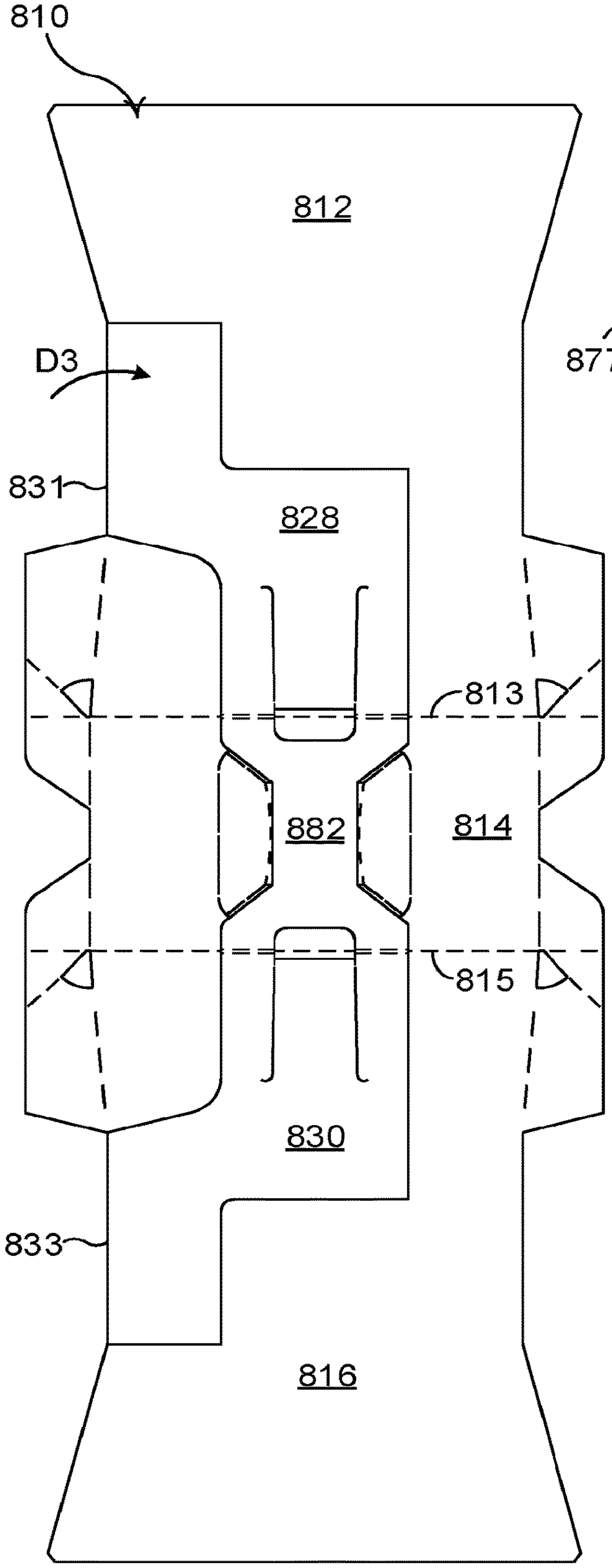

The second blank 810 is folded about fold lines 831, 833, as indicated by direction arrow D3 in FIG. 19, such that the first reinforcing member RM1 is brought into face contacting relationship with the first side panel 812 and a portion of the top panel 814 and such that the such reinforcing member RM2 is brought into face contacting relationship with the second side panel 816 and a second portion of the top panel 814.

The first and second central reinforcing panels 880*c*, 880*d* are secured to the grip panel 870*a*/870*b*.

The first reinforcing member RM1 is secured to the first side panel 812. The second reinforcing member RM2 is secured to the second side panel 816.

The first connecting panel 828 is secured to the first side panel 812. The second connecting panel 830 is secured to the second side panel 816.

The end portions 880*a*, 880*b* of the reinforcing members RM1, RM2 are unsecured to the respective side panel 812, 816.

The grip panel 870*a*/870*b* is severable or detachable from the top panel 814.

With the exception of the grip panel 870*a*/870*b* the handle structure is unsecured to the top panel 814.

In this way the handle structure is displaceable or movable with respect to outer walls 812, 814, 816 of the carrier. The handle structure is displaceable inwardly into the interior of the carrier. A portion of the handle structure can be withdrawn through a handle opening in the top panel 814, the handle opening being created upon severance of the grip panel 870*a*/870*b* from the top panel 814. The handle structure and grip panel 870*a*/870*b* form a carrying handle disposed in part externally of the carrier walls.

The second blank 810 of FIG. 15 may be advantageous in that it reduces waste material when cutting the blank from a sheet of substrate material. The footprint may be smaller, more blanks may be cut from a given area of substrate material. A plurality of second blanks 810 may be nested or arranged in a more efficient manner so as to reduce the quantity of substrate material required for a given number of blanks 810 compared to the embodiments of FIGS. 1 to 14.

The present disclosure provides a package comprising a carton or article carrier 90; 290 loaded with one or more articles B. The carton 90; 290 comprises a plurality of main or primary panels at least partially extending around an interior of the carton 90; 290. The plurality of primary panels comprises a top panel 114; 314; 514; 614; 714; 814 and a pair of side panels 112, 116; 312, 316; 512, 516; 612, 616; 712, 716; 812, 816 hingedly connected to opposed side edges of the top panel 114; 314; 514; 614; 714; 814 respectively. The carton 90; 290 further comprises a carrying handle including a handle feature H defined in at least the top panel 114; 314; 514; 614; 714; 814 and a foldable handle structure HS having opposed connecting panels 128, 130; 328, 330; 528, 530; 628, 630; 728, 730; 828, 830 and a handle strap 132/132*a*/132*b*; 332/332*a*/332*b*; 582/582*a*/582*b*; 632/632*a*/632*b*; 782/782*a*/782*b*; 882/882*a*/882*b* extending between the connecting panels 128, 130; 328, 330; 528, 530; 628, 630; 728, 730; 828, 830. The handle structure HS is hingedly connected at the opposed connecting panels 128, 130; 328, 330; 528, 530; 628, 630; 728, 730; 828, 830 thereof to the side panels 112, 116; 312, 316; 512, 516; 612, 616; 712, 716; 812, 816 along respective first edges (defined by fold lines 131,133; 331,333; 531,533; 631,633; 831,833) of the side panels 112, 116; 312, 316; 512, 516; 612, 616; 712, 716; 812, 816 such that the handle structure is foldable or folded into the interior of the carton. In the assembled condition the handle strap 132/132*a*/132*b*; 332/332*a*/332*b*; 582/582*a*/582*b*; 632/632*a*/632*b*; 782/782*a*/782*b*; 882/882*a*/882*b* is disposed generally in vertical alignment with the handle feature H. The carton 90; 290 comprises first and second opposed ends defined at least in part by opposed end edges of the top panel respectively.

The first end of the carton 90; 290 may be at least partially open and may comprise an end opening extending at least between the first edges of the side panels.

The first end of the carton 90; 290 may comprise an end closing structure 118*a*/120*a*/122*a*; 318*a*/320*a*/322*a*; 518*a*/520*a*/522*a*; 618*a*/618*c*/620*a*/622*a*/622*c*; 718*a*/720*a*/722*a*; 818*a*/820*a*/820*b*/822*a* which partially closes the first end of the carton 90; 290. The end closing structure comprises side end flaps 118*a*, 122*a*; 318*a*, 322*a*; 518*a*, 522*a*; 618*a*/618*c*, 622*a*/622*c*; 718*a*, 722*a*; 818*a*, 822*a* hingedly connected to the first end edges of the side panels 112, 116; 312, 316; 512, 516; 612, 616; 712, 716 respectively.

The handle strap may comprise opposed end portions 132*a*, 132*b*; 332*a*, 332*b*; 582*a*, 582*b*; 632*a*, 632*b*; 782*a*, 782*b*; 882*a*, 882*b* and an intermediate portion 132; 332; 582; 632; 782; 882 extending between the opposed end portions 132*a*, 132*b*; 332*a*, 332*b*; 582*a*, 582*b*; 632*a*, 632*b*; 782*a*, 782*b*; 882*a*, 882*b*. The opposed end portions 132*a*, 132*b*; 332*a*, 332*b*; 582*a*, 582*b*; 632*a*, 632*b*; 782*a*, 782*b*; 882*a*, 882*b* may be formed at least partially from the connecting panels 128, 130; 328, 330; 528, 530; 628, 630; 728, 730; 828, 830 respectively.

The plurality of panels may comprise a base panel 14; 214; 414; 652; 706/708 extending between the side panels 112, 116; 312, 316; 512, 516; 612, 616; 712, 716 such that the plurality of primary panels provides a tubular structure defining a tubular axis A. The first edges of the side panels are disposed transversely to the tubular axis A.

The carton 90; 290 may be formed from at least first and second separate blanks 10, 110; 210, 310; 410, 510; 810, wherein the first blank 10; 210; 410 comprises a panel 14; 214; 414 for forming the base panel 14; 214; 414, and wherein the second blank 110; 310; 510; 810 comprises panels for forming the top panel 114; 314; 514; 814, the side panels 112, 116; 312, 316; 512, 516; 812, 816 and the handle structure HS.

The present disclosure provides a carton or article carrier 90; 290 comprising a plurality of primary panels at least partially extending around an interior of the carton 90; 290. The plurality of primary panels comprises a first side panel 612; 712, a top panel 614; 714, a second side panel 616; 716 and at least one bottom panel 652; 706, 708 joined together to form a tubular structure having first and second opposed open ends. The carton comprises a carrying handle including: a handle feature H defined in at least the top panel 614; 714; and a foldable handle structure HS having opposed connecting panels 628, 630; 728, 730 and a handle strap 632, 632*a*, 632*b*; 782, 782*a*, 782*b* extending between the connecting panels 628, 630; 728, 730. The handle structure HS is hingedly connected at the opposed connecting panels 628, 630; 728, 730 thereof to the first end of the tubular structure (defined by fold lines 631, 633; 731, 733) such that the handle structure HS is foldable into the interior of the carton so that the handle strap 632, 632*a*, 632*b*; 782, 782*a*, 782*b* is disposed generally in vertical alignment with the handle feature H.

The connecting panels 628, 630; 728, 730 may hingedly connected to respective first edges of the side panels 612, 616; 712, 716 along first fold lines 631, 633; 731, 733 respectively. The carton 90; 290 may comprise a first end wall 618*a*/618*c*/620*a*/622*a*/622*c*/654*a*; 720*a* for at least partially closing the first end of the tubular structure.

The first end wall 618*a*/618*c*/620*a*/622*a*/622*c*/654*a*; 720*a* may comprise at least one end closure panel 618*a*, 618*c*, 622*a* 622*c*; 718*a*, 718*b* hingedly connected to the first end edge of at least one of the side panels 612, 616; 712, 716.

The first end wall 618*a*/618*c*/620*a*/622*a*/622*c*/654*a* may comprise at least one side end closure flap 618*a*, 618*c*, 622*a* 622*c* hingedly connected to the first end edge of at least one of the side panels 612, 616.

The handle structure HS may comprise at least one reinforcing member 134; 334; RM; 634; RM1, RM2. The at least one reinforcing member 134; 334; RM; 634; RM1, RM2 being hingedly connected to the handle structure HS.

The at least one reinforcing member RM; RM1, RM2 may be hingedly connected to at least one of the connecting panels 528, 530; 728, 730; 828, 830.

The at least one reinforcing member 134; 334; RM; 634 may be hingedly connected to the central portion 132; 332; 582; 632; 782 of the handle strap 132/132*a*/132*b*; 332/332*a*/332*b*; 582/582*a*/582*b*; 632/632*a*/632*b*; 782/782*a*/782*b*.

The at least one reinforcing member 134; 334; RM; 634 may be hingedly connected to the handle strap 132/132*a*/132*b*; 332/332*a*/332*b*; 582/582*a*/582*b*; 632/632*a*/632*b*; 782/782*a*/782*b*.

The handle structure HS may comprise a first reinforcing member RM1 hingedly connected to the first connecting panel 828. The handle structure HS may comprise a second reinforcing member RM2 hingedly connected to the second connecting panel 830.

The first and second reinforcing member RM1, RM2 may be hingedly opposed to each other.

The hinged connection 885, 887 between the at least one reinforcing member RM1, RM2 and a connecting panel 828, 830 may be substantially perpendicular to the hinged connection 885, 887 between the connecting panel 828, 830 and the respective side panel 812, 816.

The hinged connection 885, 887 between the at least one reinforcing member RM1, RM2 and a connecting panel 828, 830 may be oriented substantially transversely with respect to the handle strap HS.

The hinged connection 885, 887 between the at least one reinforcing member RM1, RM2 and a connecting panel 828, 830 may be oriented substantially longitudinally with respect to the tubular structure of the carrier.

The hinged connection 585, 587 between the at least one reinforcing member RM and a connecting panel 828, 830 may be oriented substantially longitudinally with respect to the handle strap HS.

The hinged connection 137; 337; 637 between the at least one reinforcing member RM and the central portion 132; 332; 632 may be oriented substantially longitudinally with respect to the handle strap HS.

The hinged connection 137; 337; 585, 587; 637 may be oriented substantially transversely with respect to the tubular structure of the carrier.

The handle structure comprises a handle strap having at least one ply. The handle strap may comprise two, or three, or more plies or layers.

The handle strap may be secured to a handle panel which defines, at least in part, a handle opening, the handle panel may form an additional ply or layer of the handle strap.

It will be appreciated that the present disclosure provides a blank comprising a handle structure hinged along a first edge of a plurality of main panels forming at part of a tubular structure of a carton. The handle structure comprises a series of panels; a first one of the series of panels is hinged to a first panel of the plurality of main panels and a second one of the series of panels is hinged to a second panel the plurality of main panels. The second panel opposes the first panel in a setup condition. The blank comprises at least one end closure panel hinged along the first edge of the plurality of main panels and being disposed between plurality of main panels providing the tubular structure and the series of panels providing the handle structure. The at least one end closure panel is separated from the series of panels providing the handle structure by a cutaway in the form of an aperture, slot, slit, cut line, severable line or any combination thereof.

It can be appreciated that various changes may be made within the scope of the present invention. For example, the size and shape of the panels may be adjusted to accommodate articles of differing size or shape.

It will be recognised that as used herein, directional references such as “top”, “bottom”, “base”, “front”, “back”, “end”, “side”, “inner”, “outer”, “upper” and “lower” do not necessarily limit the respective panels to such orientation, but may merely serve to distinguish these panels from one another.

As used herein, the terms “hinged connection” and “fold line” refer to all manner of lines that define hinge features of the blank, facilitate folding portions of the blank with respect to one another, or otherwise indicate optimal panel folding locations for the blank. Any reference to “hinged connection” should not be construed as necessarily referring to a single fold line only; indeed a hinged connection can be formed from two or more fold lines wherein each of the two or more fold lines may be either straight/linear or curved/curvilinear in shape. When linear fold lines form a hinged connection, they may be disposed parallel with each other or be slightly angled with respect to each other. When curvilinear fold lines form a hinged connection, they may intersect each other to define a shaped panel within the area surrounded by the curvilinear fold lines. A typical example of such a hinged connection may comprise a pair of arched or arcuate fold lines intersecting at two points such that they define an elliptical panel therebetween. A hinged connection may be formed from one or more linear fold lines and one or more curvilinear fold lines. A typical example of such a hinged connection may comprise a combination of a linear fold line and an arched or arcuate fold line which intersect at two points such that they define a half moon-shaped panel therebetween.

As used herein, the terms “hinged connection” and “fold line” may refer to one of the following: a scored line, an embossed line, a debossed line, a line of perforations, a line of short slits, a line of half-cuts, a single half-cut, an interrupted cutline, a line of aligned slits, a line of scores and any combination of the aforesaid options.

It should be understood that hinged connections and fold lines can each include elements that are formed in the substrate of the blank including perforations, a line of perforations, a line of short slits, a line of half-cuts, a single half-cut, a cutline, an interrupted cutline, slits, scores, any combination thereof, and the like. The elements can be dimensioned and arranged to provide the desired functionality. For example, a line of perforations can be dimensioned or designed with degrees of weakness to define a fold line and/or a severance line. The line of perforations can be designed to facilitate folding and resist breaking, to facilitate folding and facilitate breaking with more effort, or to facilitate breaking with little effort.

The phrase “in registry with” as used herein refers to the alignment of two or more elements in an erected carton, such as an aperture formed in a first of two overlapping panels and a second aperture formed in a second of two overlapping panels. Those elements in registry with each other may be aligned with each other in the direction of the thickness of the overlapping panels. For example, when an aperture in a first panel is “in registry with” a second aperture in a second panel that is placed in an overlapping arrangement with the first panel, an edge of the aperture may extend along at least a portion of an edge of the second aperture and may be aligned, in the direction of the thickness of the first and second panels, with the second aperture.

The invention claimed is:

1. A blank for forming a carton, the blank comprising a plurality of primary panels for at least partially extending around an interior of the carton in a setup condition, the plurality of primary panels comprising a top panel and a pair of side panels hingedly connected to opposed side edges of the top panel respectively, wherein the blank further comprises a carrying handle including a handle feature defined in at least the top panel and a foldable handle structure having opposed connecting panels and a handle strap extending between the connecting panels, the handle structure being hingedly connected at the opposed connecting panels thereof to the side panels along respective first edges of the side panels, the handle structure is foldable to generally align the handle strap with the handle feature, wherein the blank comprises a first end and a second end opposed to the first end, the first and second ends being defined at least in part by opposed end edges of the top panel respectively, and wherein in the setup condition, the first end is formed to be at least partially open by having an end opening extending at least between the first edges of the side panels.

2. A blank of claim 1 wherein the plurality of primary panels comprises at least one bottom panel configured to be joined together with the pair of side panels and the top panel in the setup condition to form a tubular structure of the carton having a first end and a second end opposed to the first end, at least one of the first end and the second end being at least partially open, wherein the handle structure is hingedly connected at the opposed connecting panels thereof to the first end of the tubular structure such that the handle structure is foldable into the interior of the carton in the setup condition so that the handle strap is disposed generally in alignment with the handle feature.

3. A combination of a tray blank and a covering blank for forming a package, the covering blank comprising a top panel and a pair of foldable flaps hingedly connected to respective ones of opposed edges of the top panel, each of the foldable flaps extending to a free end thereof that is opposite its hinged connection to the top panel, wherein the free end of a first one of the foldable flaps is disposed at a first distance from the free end of a second one of the foldable flaps in a tubular axis direction of the package when the covering blank is in an erected form in which the foldable flaps are folded out of a plane of the top panel and wherein the first distance is equal to or less than a linear dimension in the tubular axis direction of a tray erected from the tray blank.

4. A combination according to claim 3, wherein the tray blank comprises a base panel and a pair of opposing panels hinged to the base panel and wherein the linear dimension of the tray is defined between a pair of opposing edges of the base panel.

5. A combination according to claim 3, wherein the tray blank comprises a base panel and a pair of opposing panels hinged to the base panel, and wherein the linear dimension of the tray is defined between the opposing panels when the tray blank is in an erected form in which the opposing panels are folded out of a plane of the base panel.

6. A combination according to claim 3, wherein the covering blank is in the erected form when the package is formed wherein the foldable flaps are arranged at least partially to enclose opposed ends or sides of the package, the tray blank comprising a base panel and a pair of opposing panels hinged to the base panel, and wherein the linear dimension of the tray is defined between the opposing panels when the tray blank is in an erected form in which the opposing panels are folded out of a plane of the base panel, and wherein the tray blank is in the erected form when the package is formed in which the opposing panels partially enclose said opposed ends or sides of the package.

7. A combination according to claim 3, wherein the linear dimension extends parallel to the first distance.

8. A combination according to claim 3, wherein the linear dimension and the first distance each extends transversely of the package.

9. A combination according to claim 3, wherein the linear dimension and the first distance each extend longitudinally of the package.

10. A combination according to claim 3, wherein each of the foldable flaps comprises a corner-forming panel hingedly connected to the foldable flap for forming a corner and wherein the first distance is defined between a first corner-forming panel hingedly connected to the first one of the pair of foldable flaps and a second corner-forming panel hingedly connected to the second one of pair of foldable flaps.

11. A combination according to claim 3 wherein the covering blank comprises a carrying handle including a handle feature defined in at least the top panel and a foldable handle structure having opposed connecting panels.

12. A combination according to claim 11 further comprising at least one reinforcing member hingedly connected to the handle structure.

13. A combination according to claim 12 wherein the at least one reinforcing member is hingedly connected to the central portion of the handle strap.

14. A combination according to claim 12 wherein the at least one reinforcing member is hingedly connected to the handle strap.

15. A package comprising a tray and a covering, the covering comprising a top panel and a pair of foldable flaps hingedly connected to respective ones of opposed edges of the top panel and extending at an angle with respect to the top panel, each of the foldable flaps extending to a free end thereof that is opposite its hinged connection to the top panel, wherein the free end of a first one of the foldable flaps is disposed at a first distance from the free end of a second one of the foldable flaps in a tubular axis direction of the package and wherein the first distance is equal to or less than a linear dimension of the tray in the tubular axis direction.

16. A package according to claim 15, wherein the tray comprises a base panel and a pair of opposing panels hinged to the base panel and wherein the linear dimension of the tray is defined between a pair of opposing edges of the base panel.

17. A package according to claim 15, wherein the tray comprises a base panel and a pair of opposing panels hinged to the base panel, the opposing panels extending at an angle with respect to the base panel, and wherein the linear dimension of the tray is defined between the opposing panels.

18. A package according to claim 15, further comprising a group of articles, wherein each article in the group of articles has a first maximum length dimension defined between opposed ends thereof and a first maximum width dimension defined between opposed sides thereof, wherein the first distance is equal to or less than one of the first maximum length dimension and the first maximum width dimension and wherein the linear dimension of the tray is equal to or greater than one of the first maximum length dimension and the first maximum width dimension.

19. A package according to claim 15, wherein the tray comprises a base panel and an end flap hingedly connected to respective ends of the base panel and wherein linear dimension of the tray is defined between an outer surface of the end flap at a first end of the base panel and an outer surface of the end flap at a second, opposing, end of the base panel.

20. A package according to claim 19, wherein the tray comprises a base panel and an end flap hingedly connected to respective ends of the base panel, the tray further comprises a securing flap disposed between one of the end flaps and at least one of the articles disposed adjacent to the securing flap.

* * * * *